United States Patent
Travis et al.

(10) Patent No.: US 11,769,015 B2
(45) Date of Patent: Sep. 26, 2023

(54) USER INTERFACE DISAMBIGUATION

(71) Applicant: International Business Machines Corporation, Armonk, NY (US)

(72) Inventors: Amy Travis, Arlington, MA (US); Laura Janet Rodriguez, Durham, NC (US); Sara Beth Weber, Arlington, MA (US); Brittany Bogle, Durham, NC (US); Smriti Talwar, Clonsilla (IE); Brent Alan Miller, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 356 days.

(21) Appl. No.: 17/220,513

(22) Filed: Apr. 1, 2021

(65) Prior Publication Data
US 2022/0318510 A1    Oct. 6, 2022

(51) Int. Cl.
*G06F 40/30* (2020.01)
*G06F 40/253* (2020.01)
(Continued)

(52) U.S. Cl.
CPC .......... *G06F 40/30* (2020.01); *G06F 9/451* (2018.02); *G06F 16/9024* (2019.01);
(Continued)

(58) Field of Classification Search
CPC ...... G06F 40/30; G06F 9/451; G06F 16/9024; G06F 40/166; G06F 40/253; G06F 40/284
See application file for complete search history.

(56) References Cited

U.S. PATENT DOCUMENTS 6,275,978 B1   8/2001   Bell
7,617,232 B2   11/2009  Gabbert
(Continued)

FOREIGN PATENT DOCUMENTS

CN    110826331 A    2/2020
CN    111539204 A    8/2020

OTHER PUBLICATIONS

Pedersen, T., Banerjee, S., & Patwardhan, S. (2005). Maximizing semantic relatedness to perform word sense disambiguation. University of Minnesota supercomputing institute research report UMSI, 25, 2005. (Year: 2005).*
(Continued)

*Primary Examiner* — Bhavesh M Mehta
*Assistant Examiner* — Philip H Lam
(74) *Attorney, Agent, or Firm* — Edward P. Li

(57) ABSTRACT

Systems, methods, and computer programming products for alleviating ambiguity amongst the terms and language displayed by the user interface of software products and services. The disclosed solutions catalog terms displayed by the UI of software and services and identify where overlapping terms with the same or substantially similar term names are presented by the UI but have different meanings than the software most familiar to the user. Natural language processing is leveraged to derive meanings of software terms using the context of the surrounding words and text elements within the UI, as well as product documentation, error messages, sentiment and other textual clues. Ambiguity among overlapping terms is alleviated by modifying the UI, highlighting differences in term definitions from the software or services a user is most familiar with using, and updating the UI in a manner that differentiates the overlapping terms displayed by accessed products or services.

17 Claims, 14 Drawing Sheets

(51) Int. Cl.
*G06F 40/166* (2020.01)
*G06F 40/284* (2020.01)
*G06F 9/451* (2018.01)
*G06F 16/901* (2019.01)

(52) U.S. Cl.
CPC .......... *G06F 40/166* (2020.01); *G06F 40/253* (2020.01); *G06F 40/284* (2020.01)

(56) References Cited

U.S. PATENT DOCUMENTS

| | | | |
|---|---|---|---|
| 9,760,627 | B1 | 9/2017 | Bradley |
| 9,817,809 | B2 | 11/2017 | Shostak |
| 10,339,150 | B1* | 7/2019 | Silk .................. G06F 16/24578 |
| 10,565,314 | B2 | 2/2020 | Bull |
| 10,755,052 | B2 | 8/2020 | Deng |
| 2009/0106015 | A1* | 4/2009 | Li .......................... G06F 40/44 704/E15.012 |
| 2014/0040275 | A1* | 2/2014 | Dang .................. G06F 16/2228 707/741 |
| 2015/0356418 | A1* | 12/2015 | Yampolska ........... G06F 16/955 707/739 |
| 2017/0235715 | A1* | 8/2017 | Redrup ................... G06F 16/93 707/758 |
| 2019/0102377 | A1 | 4/2019 | Neuman |
| 2019/0370696 | A1* | 12/2019 | Ezen Can .............. G06N 5/025 |
| 2021/0019357 | A1* | 1/2021 | Bennett ................... G06F 40/20 |
| 2022/0100256 | A1* | 3/2022 | Kan ....................... G06F 1/3268 |

OTHER PUBLICATIONS

Navigli, R., & Lapata, M. (2009). An experimental study of graph connectivity for unsupervised word sense disambiguation. IEEE transactions on pattern analysis and machine intelligence, 32(4), 678-692. (Year: 2009).*

Schütze, H. (1998). Automatic word sense discrimination. Computational linguistics, 24(1), 97-123. (Year: 1998).*

Rodriguez, M. A., & Egenhofer, M. J. (2003). Determining semantic similarity among entity classes from different ontologies. IEEE transactions on knowledge and data engineering, 15(2), 442-456. (Year: 2003).*

Mell et al., "The NIST Definition of Cloud Computing", Recommendations of the National Institute of Standards and Technology, Special Publication 800-145, Sep. 2011, 7 pages.

Walia et al., "Case Based Interpretation Model for Word Sense Disambiguation in Gurmukhi", 9th International Conference on Cloud Computing, Data Science & Engineering (Confluence), 2019, pp. 359-364.

Yosef et al., "AIDA: An Online Tool for Accurate Disambiguation of Named Entities in Text and Tables", Proceedings of the VLDB Endowment, vol. 4, No. 12, Aug. 29-Sep. 3, 2011, Seattle, Washington, pp. 1450-1453.

* cited by examiner

USER INTERFACE DISAMBIGUATION

TECHNICAL FIELD

The present disclosure relates generally to the field of natural language processing, user interfaces, and application management, and more particularly to alleviating ambiguity among overlapping terms and terminology defined by software being displayed by a user interface.

BACKGROUND

Today, many users and enterprises consume applications and services provided by more than one cloud service provider. The use of multiple cloud service providers reduces dependency on any single vendor, allows the users and enterprises to take advantage of the relative strengths of each provider, and enables optimization of cloud usage and costs. As enterprises transform and expand, they often find themselves leveraging multiple clouds, both public and private, in order to deliver compelling solutions, software, services and tools to their clients. However, the more cloud providers an organization uses, the more complex the task of managing multiple clouds becomes. Multi-cloud management provides enterprises with the ability to effectively manage enterprise applications running across multiple datacenters and/or cloud environments, as if the tools, applications and/or services were part of a single seamless computing environment, providing visibility, governance and automation. One result of multi-cloud usage is that users and enterprises are exposed to duplicative text with different meanings in the multiple software environments they interact with.

SUMMARY

Embodiments of the present disclosure relate to a computer-implemented method, an associated computer system and computer program product for alleviating ambiguity amongst terms and textual elements of a user interface having a same or substantially similar term name, but with a differing definition or meaning depending on the software, service or other type of software product being displayed by the user interface. The computer-implemented method comprises the steps of accessing software; extracting one or more terms displayed as part of the software's user interface (UI) using natural language processing (NLP); generating, by the processor, a network map cataloging the one or more terms and relationships among the one or more terms; building, by the processor, a glossary of the one or more terms from the network map; recording, by the processor, interactivity data comprising one or more interactivity parameters describing a level of interactivity with the software; comparing, by the processor, the interactivity data for the software with interactivity data of previously accessed software; in response to comparing the interactivity data, determining, by the processor, that an interactivity level of one or more of the previously accessed software is greater than an interactivity level of the software being accessed; cross-checking, by the processor, a glossary of the previously accessed software that has the interactivity level greater than the software being accessed with the glossary of the one or more terms to identify one or more overlapping terms, wherein the one or more overlapping terms have different meanings; modifying, by the processor, the software's UI to indicate a presence of the one or more overlapping terms being displayed by the software's UI; and alerting a user of the different meanings among the overlapping terms.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
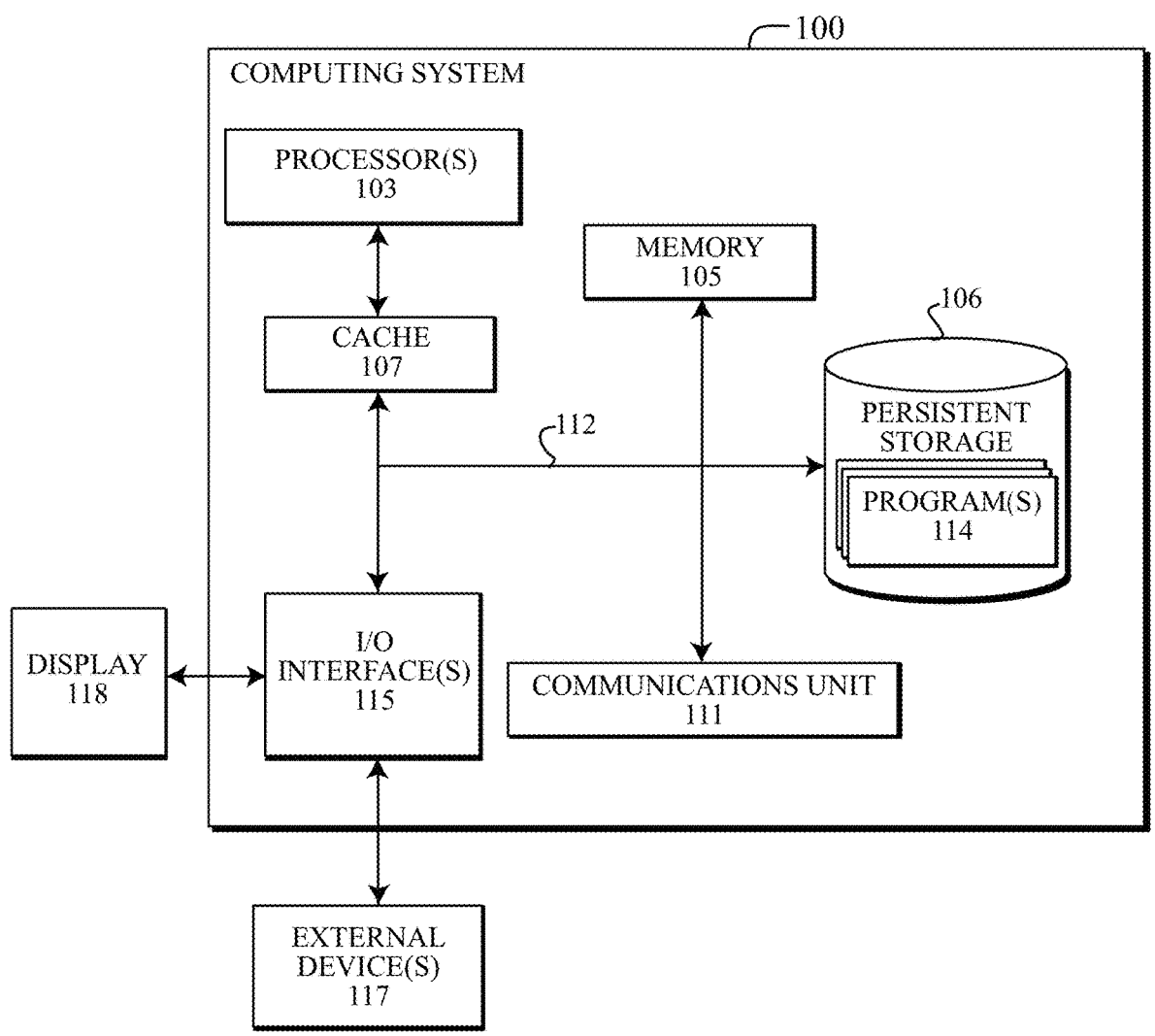
FIG. 1 depicts a block diagram illustrating internal and external components of an embodiment of a computing system in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

Hybrid cloud and cloud-based software delivery allows users, enterprises and other entities access to multiple different public and/or private clouds, where each may be operated by different cloud providers hosting numerous different software products, applications, services, platforms, workloads, tools and solutions (generally described collectively as "software" or "software products"). The software being provided by the different cloud providers may be created and developed by different developers and programmers, and as a result, the terms, language and vocabulary used within the various products, applications and services are typically not standardized across the software industry. As software bundling becomes a more prevalent practice to help with multi-cloud management, a problem has developed over time with streamlined user interfaces that offer a single interface experience for accessing multiple software products provided by a plurality of different developers and providers. More specifically, when collections of different software programs, applications and services, etc., are available within the single interface experience, the different software products made accessible through the interface often may display terms or terminology that appears to be identical or substantially similar. Often, however, the seemingly identical terms or terminology of the software being accessed can have different meanings, unbeknownst to the user. In some cases, a user may not even be aware that a single interface is delivering software products from multiple different software developers and thus may not even be considering whether the terms or terminology presented by the interface that appear the same, actually have different meanings. When a user is unaware of the different meanings of similar terms among the various software products being accessed within the single interface experience, the result can be costly mistakes and errors resulting from misunderstanding or misinterpreting the seemingly similar terminology presented by the interface.

The embodiments of the present disclosure recognize that user interfaces (UI) offering a streamlined interface experience for users accessing a plurality of software applications, products, tools services and other software solutions, may display visual elements of the UI comprising a plurality of terms, images or other elements that may have different meanings and definitions, depending on the software being accessed at a particular moment in time. The embodiments of the present disclosure further recognize that differentiation among the terms and terminology may not be readily apparent to a user while accessing the various software products via a streamlined, single-interface UI. Accordingly, embodiments of the present disclosure may assist the user by identifying and differentiating among the overlapping terms and terminology displayed by a plurality of software products being accessed. One or more types of alerts and messages may be displayed to the user indicating where the differentiation between the terms and terminology exists and may further modify the UI visually to differentiate or highlight the one or more differences among overlapping terms having differing definitions.

Embodiments of the present disclosure may leverage the use of Natural Language Processing (NLP) techniques to detect the different software products being accessed, that may comprise the same or similar terminology having different definitions. The NLP techniques may extract key words, terms, and terminology that is visually being displayed by the UI as one or more textual or visual elements. The NLP techniques may generate a network map which may comprise a graph of the interconnected terms extracted from the UI for each product being accessed as nodes of the graph. NLP techniques may catalog each of the terms and terminology for the particular software accessed as well as the relationships among the terms and terminology being displayed by the UI. Relationships among terms and terminology may include relationships based on distances between terms, the frequency of terms and a term's part of speech. From the graph of the generated network map, a glossary of key terms can be generated and stored in a database or other type of repository. Key terms in the glossary can be prioritized based on the frequency of a user encountering the terms for the software including, but not limited to, the prevalence of the term being displayed by the UI, within the UI's content, within official documentation of the software product, and based on the part of speech of the key term.

In some embodiments, each time a user loads or interacts with a software product, a user's interaction level may be recorded, including the amount of time a user spends experiencing the software product being accessed. In some embodiments, certain types of software, such as software experienced most frequently by users, software the user operates for the longest amounts of time, and/or particular software designated by the user and/or the user's role, may be considered a "core" software product against which other software products' terms and terminology may be evaluated for similar terms and terminology to those key terms of the core products most familiar to the user. When software products that are not considered core products are accessed, the glossary of the non-core product may be cross-referenced against glossaries for core software products used more frequently by the user. Terms and terminology that overlap among core products, applications, services, etc., but have different definitions or meanings, may be visually decorated and identified within the UI. Embodiments of the disclosure may further alert the user via the UI, of the discrepancy among definitions, and allow the user to select one or more options relating to the overlapping terms. For example, the UI may be modified to offer an opportunity for users to adjudicate the alerts and/or correct improper findings of differing definitions, input substitute term names to differentiate among terms displayed by the UI, and/or input alternative definitions that may be shared with other users of the software. In some embodiments, machine learning may be integrated to learn how particular users respond to alerts and UI modifications and automate default responses to identifying overlapping terms with differing definitions based on a user's preferred response and behaviors.

Computing System

FIG. 1 illustrates a block diagram of an embodiment of a computing system 100, which may be a simplified example of a computing device (i.e., a physical bare metal system or virtual system) capable of performing the computing operations described herein for removing and alleviating ambiguity among software products displayed by a user interface. Computing system 100 may be representative of the one or more computing systems or devices implemented as part of computing environment 200, 220, 230, 300, 700 and 720 as shown in FIGS. 2A-7B, in accordance with the embodiments of the present disclosure and further described below in detail. It should be appreciated that FIG. 1 provides only an illustration of one implementation of a computing system 100 and does not imply any limitations regarding the environments in which different embodiments may be implemented. In general, the components illustrated in FIG. 1 may be representative of any electronic device, either physical or virtualized, capable of executing machine-readable program instructions.

Although FIG. 1 shows one example of a computing system 100, a computing system 100 may take many different forms, including bare metal computer systems, virtualized computer systems, container-oriented architecture, and microservice-oriented architecture. For example, computing system 100 can take the form of real or virtualized systems, including but not limited to desktop computer systems, laptops, notebooks, tablets, servers, client devices, network devices, network terminals, thin clients, thick clients, kiosks, mobile communication devices (e.g., smartphones), multiprocessor systems, microprocessor-based systems, minicomputer systems, mainframe computer systems, smart devices, and/or Internet of Things (IoT) devices. The computing systems 100 can operate in a local computing environment, networked computing environment, a containerized computing environment comprising one or more pods or clusters of containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and cache 107 memory. In general, memory 105 can include any suitable volatile or non-volatile computer-readable storage media and may comprise firmware or other software programmed into the memory 105. Program(s) 114, software applications, processes, services, and installed components thereof, described herein, may be stored in memory 105 and/or persistent storage 106 for execution and/or access by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network 250. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 can be loaded into persistent storage 116.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

System for Alleviating User Interface Ambiguity Between Software

It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Detailed herein are embodiments of methods, systems and computer program products describing one or more approaches that may be executed using one or more computing systems 100 operating within a computing environment 200, 220, 230, 300, 600, 610, 620, 630, 700, 720 and variations thereof. FIGS. 2A-7B depict embodiments of one or more computing environments 200, 220, 230, 300, 600, 610, 620, 630, 700, 720 describing approaches for alleviating ambiguity within a UI 219, including the implementation of approaches for identifying overlapping terms and terminology used by different software products being accessed, generating a glossary of key terms, comparing the glossary of key terms with the software being accessed to determine whether key terms have differing definitions and modifying a UI 219 to alleviate ambiguity about differing definitions between the different software products being displayed by the UI 219. Embodiments of computing environments 200, 220, 230, 300, 600, 610, 620, 630, 700, 720 may include a plurality of computing systems 100, both physical and/or virtualized, that may be interconnected via a computer network 250. The interconnected computing systems 100 communicating over computer network 250 can include but are not limited to host computing system 201, client systems 217a-217n, one or more data center(s) 231, one or more private cloud service provider(s) 223, one or more public cloud service provider(s) 227, user computing device 235a-235n and/or one or more network-accessible repository 236.

Embodiments of host computing system 201, client systems 217a-217n, data center(s) 231, private cloud service provider(s) 223, public cloud service provider(s) 227, user computing device 235a-235n and network-accessible repository 236, may each be a specialized computer system comprising specialized configurations of hardware, software or a combination thereof as shown and described in FIGS. 2A-7B of the present disclosure and in embodiments described herein. Embodiments of the host computing system 201, client systems 217a-217n, data center(s) 231, private cloud service provider(s) 223, public cloud service provider(s) 227, user computing device 235a-235n and network-accessible repository 236, may not only comprise the elements of the systems and devices depicted in FIGS. 2A-7B, but may also incorporate one or more elements of computing system 100, as shown in FIG. 1 and described in the COMPUTING SYSTEM section above. For example, one or more elements of the computing system 100 may be integrated into the host computing system 201, client systems 217a-217n, data center(s) 231, nodes of the private cloud service provider(s) 223, nodes of the public cloud service provider(s) 227, user computing device 235a-235n and/or one or more network-accessible repository 236 including the integration of one or more processor(s) 103, memory 105, persistent storage 106, cache 107, communications unit 111, I/O interface(s) 115, external device(s) 117 and/or display 118.

Embodiments of the host computing system 201, client systems 217a-217n, data center(s) 231, user computing device 235a-235n, network-accessible repository 236 and/or nodes of the cloud service providers 223, 227, may be desktop computers, laptop computers, tablet computers, smartphones, server computers, or any other computer system known in the art. In some embodiments host computing system 201, client systems 217a-217n, data center(s) 231, user computing device 235a-235n, more network-accessible repository 236 and nodes of the cloud service providers 223, 227 may represent computer systems utilizing clustered computers and components to act as a single pool of seamless resources when accessed through network 250. For example, such embodiments may be part of storage area network (SAN), and network attached storage (NAS) applications.

Embodiments of the computer network 250 may be constructed using wired, wireless or fiber optic connections. As shown in the exemplary embodiments, the data host computing system 201, client systems 217a-217n, one or more data center(s) 231, one or more private cloud service provider(s) 223, one or more public cloud service provider(s) 227, user computing device 235a-235n and one or more network-accessible repository 236 may connect and communicate over the network 250 using a communication unit 111, such as a network interface controller or other network communication hardware. Embodiments of the communication unit 111 may implement specialized electronic circuitry allowing for communication using a specific physical layer and a data link layer standard. For example, Ethernet, Fiber channel, Wi-Fi or Token Ring. Communication unit 111 may further allow for a full network protocol stack, enabling communication over network 250 to the group of computer systems or other computing hardware devices linked together through communication channels. The network 250 may facilitate communication and resource sharing among the host computing system 201, client systems 217a-217n, one or more data center(s) 231, one or more private cloud service provider(s) 223, one or more public cloud service provider(s) 227, user computing device 235a-235n, one or more network-accessible repository 236 and other network accessible systems connected to the network 250. Examples of network 250 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

Cloud computing is a model of service delivery for enabling convenient, on-demand network 250 access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
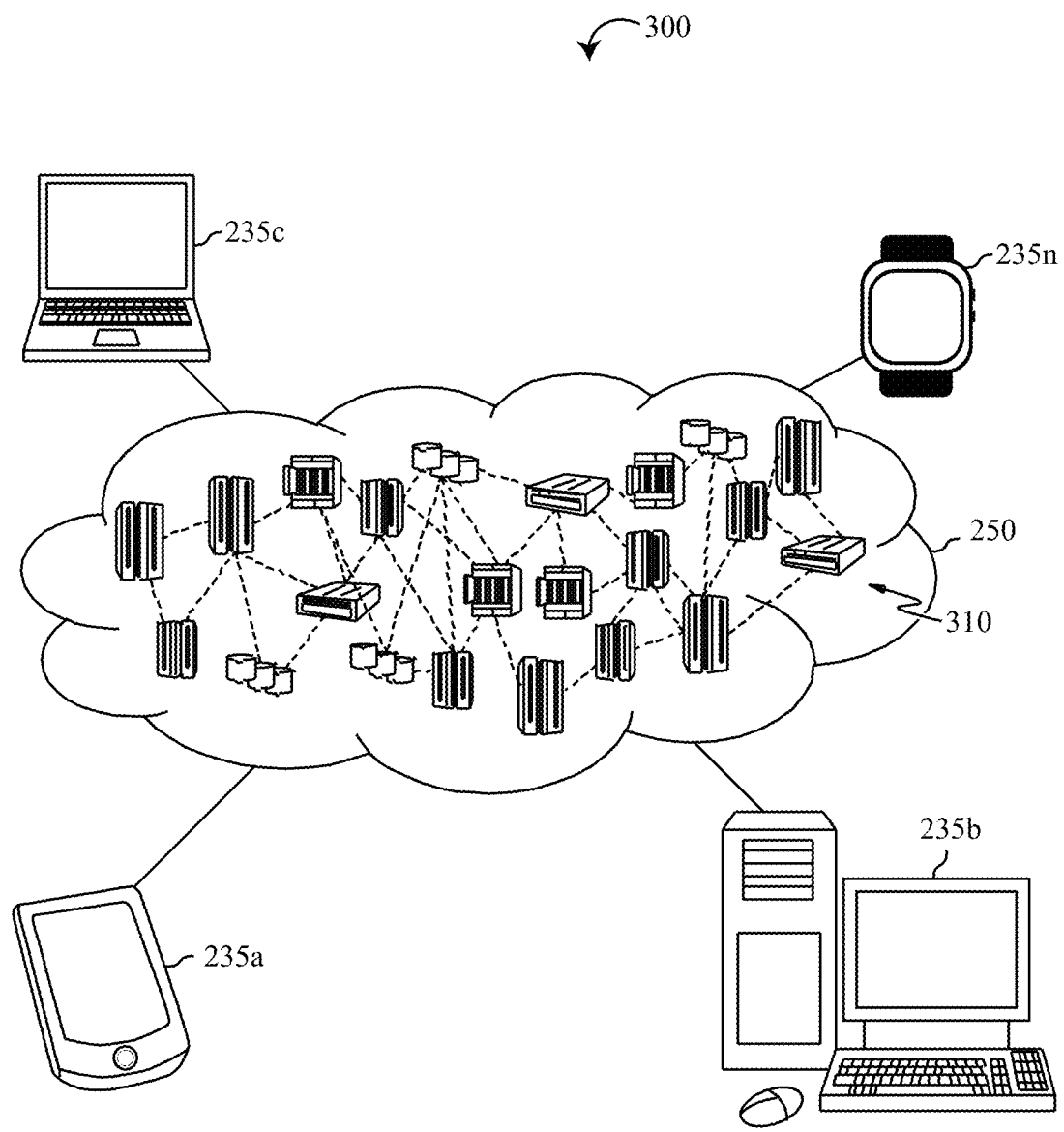
FIG. 3 depicts an embodiment of a cloud computing environment in accordance with the present disclosure.

Referring to the drawings, FIG. 3 is an illustrative example of a cloud computing environment 300. As shown, cloud computing environment 300 includes one or more cloud computing nodes 310 with which user computing devices 235a-235n and/or client systems 217a-217n may be used by cloud consumers, to access one or more software products, services, applications, and/or workloads provided by the cloud service providers 223, 227. Examples of the user computing devices 235a, 235b, 235c . . . 235n are depicted and may include devices such as a smartphone or cellular telephone, desktop computer, laptop computer, and/or any other computing device including non-traditional computing devices such as internet-enabled smart devices, and IoT devices, such as the smartwatch depicted in FIG. 3. Nodes 310 may communicate with one another and may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of user computing devices 235 shown in FIG. 3 are intended to be illustrative only and that computing nodes 310 and cloud computing environment 300 can communicate with any type of computerized device over any type of network and/or network addressable connection (e.g., using a web browser).

Figure 4:
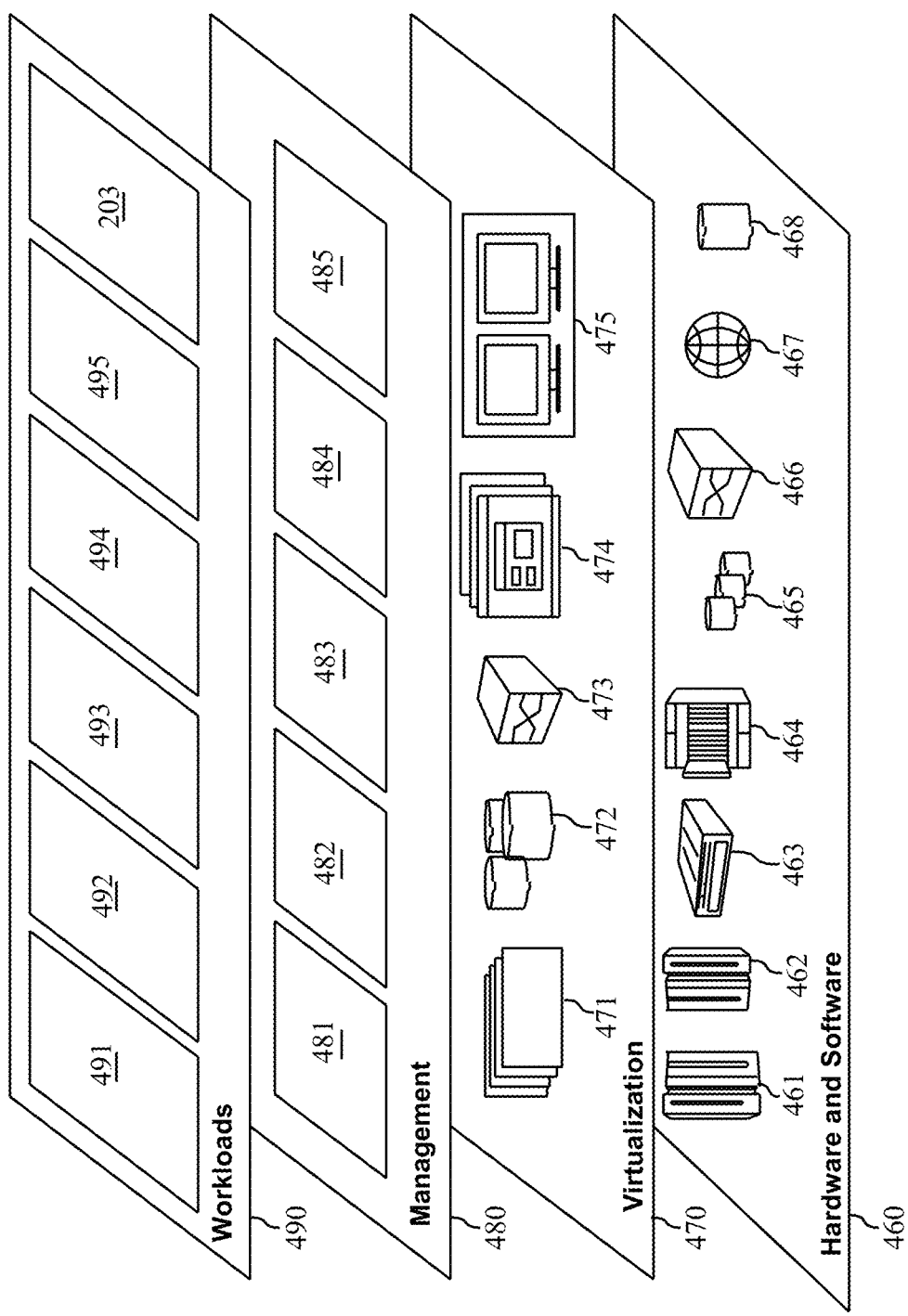
FIG. 4 depicts an embodiment of abstraction model layers of a cloud computing environment in accordance with the present disclosure.

Referring now to FIG. 4, a set of functional abstraction layers provided by cloud computing environment 350 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include: mainframes 461; RISC (Reduced Instruction Set Computer) architecture-based servers 462; servers 463;

blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include: software development and lifecycle management 491, data analytics processing 492, virtual classroom education delivery 493, transaction processing 494; multi-cloud management 495 and disambiguation module 203.

Figure 2A:
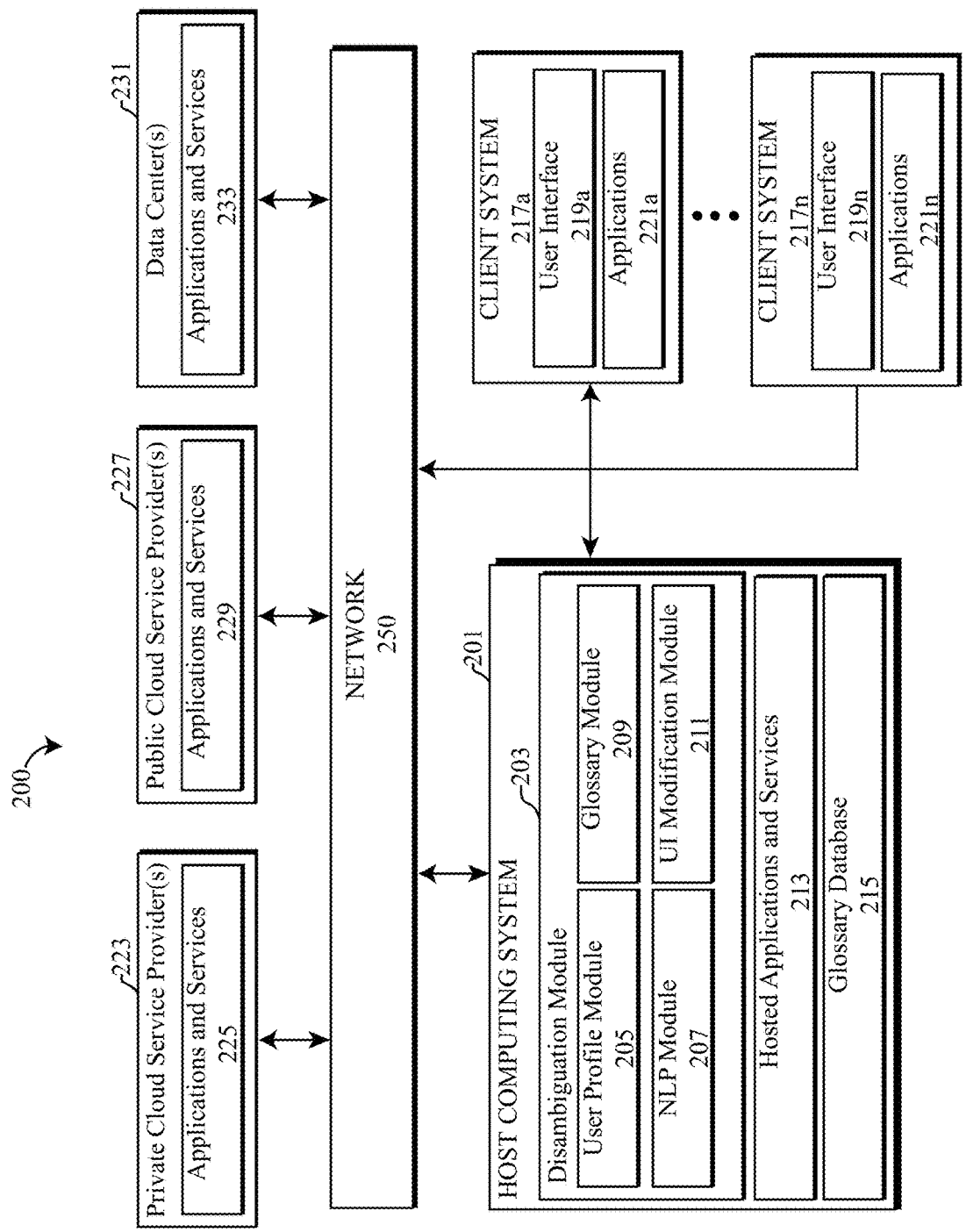
FIG. 2A depicts a functional block diagram describing an embodiment of a computing environment in accordance with the present disclosure.

FIG. 2A depicts an embodiment of computing environment 200, capable of alleviating ambiguity between terms and terminology of one or more different software products, including (but not limited to) services, applications, tools, workloads, etc., being accessed by one or more client system 217a-217n (referred to generally herein as "client system 217.") for display by a user interface 219a-219n (herein referred to generally as "UI 219") of the client systems 217. Software products being delivered and displayed by the client system 217 via UI 219 may be accessed from a plurality of different sources. For example, as shown in the embodiment of FIG. 2A, client system 217 may access and display one or more applications 221a-221n locally stored by the client system 217, as well as hosted applications and services 213 delivered to the client system 217 by host computing system 201, applications and services 225, 229, 233 hosted by private cloud service provider(s) 223, public cloud service provider(s) 227 and/or data center(s) 231.

Embodiments of computing environment 200 may include a host computing system 201, which may provide disambiguation software and/or services to the one or more client system 217 accessing the plurality of different software products available to the client system 217 over network 250. As shown in the Figures, host computing system 201 may include a disambiguation module 203 which may be responsible for performing one or more tasks, functions and/or processes for alleviating ambiguity between the terms or terminology of the software products being accessed and displayed by the UI 219. The term "module" may refer to a hardware module, software module, or a module may be a combination of hardware and software resources. A module (whether hardware, software or a combination thereof) may be designed to implement or execute one or more specific tasks, routines or functions. Embodiments of hardware-based modules may include self-contained components such as chipsets, specialized circuitry, one or more memory 105 devices and/or persistent storage 106. A software-based module may be part of a program 114, program code or linked to program code containing specific programmed instructions loaded into a memory 105 device or persistent storage 106 device of a computing system 100 operating within a computing environment 200, 220, 230, 300, 600, 610, 620, 630, 700, 720. Embodiments of the disambiguation module 203 may comprise one or more components or sub-modules that may perform the tasks, processes or functions associated with alleviating ambiguity between the terms and terminology displayed by the software products via the UI 219. For example, as shown in FIG. 2A, embodiments of the disambiguation module 203 may comprise a user profile module 205, an NLP module 207, a glossary module 209 and/or a UI modification module 211.

Embodiments of the user profile module 205 may perform functions, tasks or processes associated with registering new users and/or maintaining profiles of existing users of the disambiguation module 203. Embodiments of user profiles created by the user profile module 205 may track and record preferences of the user, as well as one or more roles the user may be associated with, such as an assigned role within an enterprise or network. In some embodiments, user profiles may track software products being accessed and used by the users. Moreover, in some instances, the user profile module 205 may record the amount of time a user spends accessing each software product and log the user's time spent accessing each of the software products and/or frequency of interactions with the software products to the user's profile. User profiles comprising records of a user's interactions and preferences for software products may be stored by user profile module 205, storage devices, databases and/or repositories that may be accessible to the disambiguation module 203 locally or via network 250.

Embodiments of the user profiles created and stored by the user profile module 205 may help the disambiguation module 203 identify one or more software products that the user may be most familiar with and/or prefer. The preference, or level of familiarity may be calculated in some instances based on an amount of time spent by the user accessing or interacting with each software product recorded to the user's profile and/or the frequency of interactions with each software product. In some embodiments, the user profile module 205 may calculate an interactivity level based the amount of time spent by the user accessing each of the software products and the frequency of interactions with each software product. Based on the interactivity parameters, an interactivity level may be calculated which may represent a user's overall preference, affinity or familiarity with one or more software products.

Embodiments of the user profile module 205 may designate one or more software products within a user's profile as being "core" products or default products, by which terms and terminology of other software products may be judged against and differentiated; for example, based on the software products with the highest interactivity level. In alternative embodiments, core products may be defined by a user's role assigned to the user's profile and/or based on the user's selection of products that the user has designated to be the core products. The designation of products as core products in the user's profile may change over time. For example, the core products may change as the user changes roles or adopts new software which the user begins to access more frequently than previously designated core products and/or begins accessing for longer periods of usage over an extended length of time.

Embodiments of the disambiguation module 203 may comprise an NLP module 207. Embodiments of the NLP module 207 may perform functions, tasks and processes of the disambiguation module 203 associated with understanding and cataloging the terms and terminology displayed by the software products on the UI 219, the relationships among terms within a software product, the parts of speech of the terms, as well as frequency and importance of the terms being displayed. Moreover, in some embodiments, the NLP module 207 may build glossaries of key terms which may include network maps comprising graphs generated during the cataloging of the terms and terminology which can express the relationships among the terms and terminology of each software product. The data from the graphs of the network maps can be cross-referenced among software products to identify overlapping terms having similar appearances but differing definitions. Embodiments of the NLP module 207 may support a plurality of languages. The NLP module 207 may perform the functions, tasks and processes associated with understanding and cataloging the terms and terminology displayed by the software products as well as the relationships among the terms, parts of speech etc., in any available language the NLP module 207 may be programmed to understand. Moreover, embodiments of the NLP module 207 may cross-reference and compare glossaries of key terms for software products even when the terms and terminology of the different software products or core products are in different languages.

Each time a software product is accessed, embodiments of the NLP module 207 may extract the terms and terminology using natural language processing techniques. The NLP module 207 may ingest the software product's metadata as well as the content accessible to the user across all pages of the software product; for example, one or more visual elements such as search bars, data tables, buttons, tabs, labels, images, text, graphics, etc. In some embodiments, additional data sources related to the software product may be ingested by the NLP module 207 as well. For example, the NLP module 207 may ingest official documentation associated with the software product, such as operation manuals, help materials, and supplementary materials. In some embodiments, NLP module 207 may use sentiment analysis to help identify the terms and terminology being ingested as well as the parts of speech associated with each term and being ingested by the NLP module 207. In the exemplary embodiments, the algorithms identifying terms and parts of speech thereof may be implemented using a tokenization process.

Figure 5:
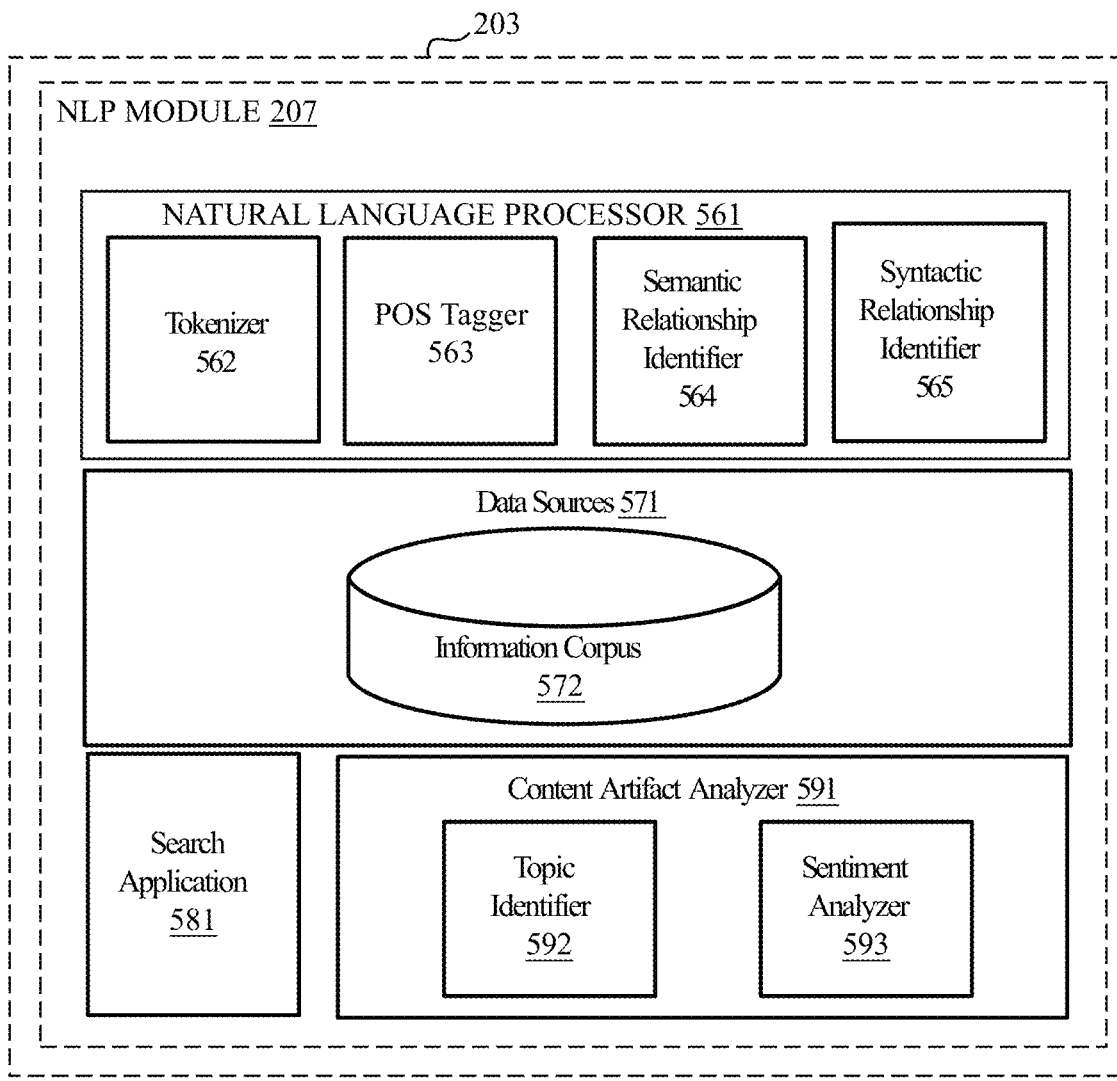
FIG. 5 depicts a diagram describing an embodiment of a natural language processing module in accordance with the present disclosure.

Referring to the drawings, FIG. 5 provides a more detailed view of the one or more components that may comprise NLP module 207. In some embodiments, the NLP module 207 may include a natural language processor 561, data sources 571, a search application 581, and/or a content artifact analyzer 591. The natural language processor 561 may comprise a computer module that analyzes the content of the software product being accessed and displayed by the UI 219 and other electronic documents accessible to the NLP module 207, such as official documentation for the software product(s). The natural language processor 561 may perform various methods and techniques for analyzing the ingested data and metadata (e.g., syntactic analysis, semantic analysis, etc.). The natural language processor 561 may be configured to recognize and analyze any number of natural languages. In some embodiments, the natural language processor 561 may parse passages of the displayed content and/or visual elements being displayed by the UI 219. Further, the natural language processor 561 may include various modules to perform analyses of the user input. These modules may include, but are not limited to: a tokenizer 562, a part-of-speech (POS) tagger 563, a semantic relationship identifier 564, and a syntactic relationship identifier 565.

Embodiments of tokenizer 562 may be a computer module that performs lexical analysis. The tokenizer 562 may convert a sequence of characters into a sequence of tokens. A token may be a string of characters displayed as text or visual elements by the software product on the UI 219 and/or electronic documents provided by and/or associated with the software product. Further, in some embodiments, the tokenizer 562 may identify word boundaries of the textual elements being displayed by the UI 219 and break text passages within the displayed textual elements into component of the textual elements, such as words, multiword tokens, numbers, and punctuation marks. In some embodiments, the tokenizer 562 may receive a string of characters, identify the lexemes in the string, and categorize them into tokens.

Consistent with various embodiments, the Part of Speech (POS) tagger 563 may be a computer module that marks up a word in passages to correspond to a particular part of speech. The POS tagger 563 may read a passage or other text in natural language and assign a part of speech to each word or other token. The POS tagger 563 may determine the part of speech to which a word (or other text element) corresponds, based on the definition of the word and the context of the word. The context of a word may be based on its relationship with adjacent and related words in a phrase, sentence, or paragraph. In some embodiments, the context of a word may be dependent on one or more previously analyzed textual elements. In embodiments, the output of the natural language processor 561 may populate a text index, a triplestore, or a relational database to enhance the contextual interpretation of a word or term. Examples of parts of speech that may be assigned to words include, but are not limited to, nouns, verbs, adjectives, adverbs, and the like. Examples of other part of speech categories that POS tagger 563 may assign include, but are not limited to, comparative or superlative adverbs, wh-adverbs, conjunctions, determiners, negative particles, possessive markers, prepositions, wh-pronouns, and the like. In some embodiments, the POS tagger 563 may tag or otherwise annotate tokens of a passage with part of speech categories. In some embodiments, the POS tagger 563 may tag tokens or words of a passage to be parsed by the natural language processor 561.

In some embodiments, the semantic relationship identifier 564 may be a computer module that may be configured to identify semantic relationships of recognized text elements (e.g., words, phrases) displayed by the UI 219 and/or documents transmitted one or more systems or service providers delivering the software products to users; for example, cloud service providers 223, 227, data center(s) 231 and/or host computing systems 201. In some embodiments, the semantic relationship identifier 564 may determine functional dependencies between entities and other semantic relationships.

Consistent with various embodiments, the syntactic relationship identifier 565 may be a computer module that may be configured to identify syntactic relationships in a passage composed of tokens. The syntactic relationship identifier 565 may determine the grammatical structure of sentences such as, for example, which groups of words are associated as phrases and which word is the subject or object of a verb. The syntactic relationship identifier 565 may conform to formal grammar.

In some embodiments, the output of natural language processor 261 may be used by search application 581 to perform a search of a set of (e.g., one or more) corpora to retrieve information regarding content artifacts. As used herein, a corpus may refer to one or more data sources 571. In some embodiments, the data sources 571 may include data warehouses, information corpora, data models, and document repositories. In some embodiments, the data sources 571 may include an information corpus 572. The information corpus 572 may enable data storage and retrieval. In some embodiments, the information corpus 572 may be a storage mechanism that houses a standardized, consistent, clean, and integrated list of conversation topics and/or emotional sentiments. The information corpus 572 may also store, for each topic/sentiment, a list of associated outcomes. For example, the information corpus 572 may include a ranking of conversational topics for each user, and/or a profile for each user. The data may be sourced from various operational systems. Data stored in the information corpus 572 may be structured in a way to specifically address reporting and analytic requirements. In some embodiments, the information corpus 572 may be a data repository, a relational database, triplestore, or text index.

In some embodiments, the content artifact analyzer 591 may be a module that identifies conversational topics and user sentiments associated with one or more topics. In some embodiments, the content artifact analyzer 591 may include a topic identifier 592 and a sentiment analyzer 593. When textual elements of the UI 219 are inputted into the NLP module 207, the content artifact analyzer 591 may be configured to analyze textual elements inputted using natural language processing to identify one or more content topics, including one or more intents and entities associated with the input. The content artifact analyzer 591 may first parse the textual elements using the natural language processor 561 and related subcomponents 562-565. After parsing the textual elements, the topic identifier 592 may identify one or more topics present in the content that was parsed. This may be done, for example, by searching a dictionary (e.g., information corpus 572) using the search application 581.

The sentiment analyzer 593 may determine the content sentiment for the ingested data and metadata of the software product, according to the content topic identified by topic identifier 592. This may be done by using the search application 291 to traverse the various data sources (e.g., the information corpus 272) for information regarding the terms and phrases used within the user input. The sentiment analyzer 593 may search, using natural language processing, documents from the various data sources 571 for terms related to those detected as part of the ingested data and/or metadata of the software products being accessed.

In some embodiments, the natural language processor 561 may parse the ingested data and metadata provided by software product and displayed by UI 219 and the software product, in order to generate corresponding data structures for one or more portions of the inputted data. For example, in response to receiving the textual or visual elements of the software products displayed by the UI 219, the natural language processor 561 may output parsed textual elements represented in the form of a parse tree, network map or other graph structure. Embodiments may filter the terms and terminology being parsed by the NLP module 207 based on parts of speech and a graphing algorithm may add the parsed terms or words to a graph as vertices or nodes of the graph. For example, in the exemplary embodiment of FIG. 7A, application or services 703a, 703b are parsed by NLP module 207 and the terms processed by NLP module 207 are generated into a network map 704a, 704b corresponding to the textual and visual elements of the software products that were processed, graphically representing the terms and relationships between the terms as nodes and vertices. In some instances, an edge can be added between the terms and words displayed by the graph. Edges may be added between words that fall within a particular distance of each other, as set by the graphing algorithm, NLP module 207 and/or the user.

Figure 7A:
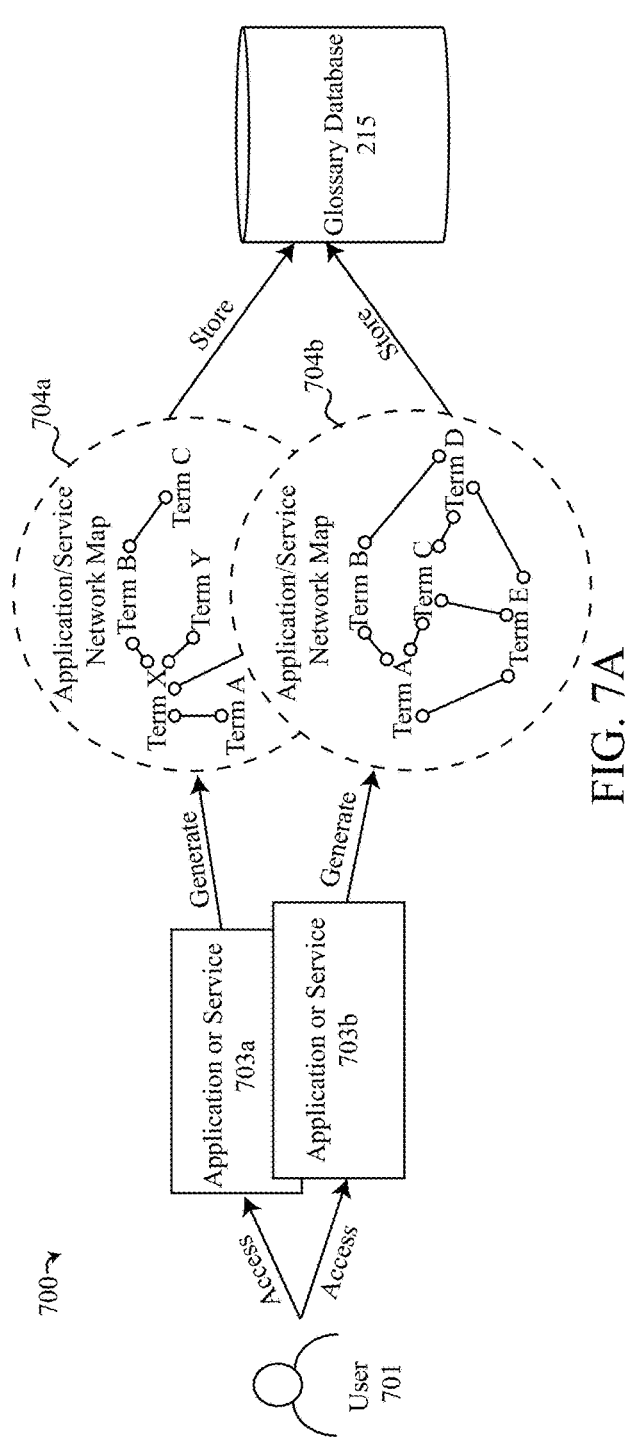
FIG. 7A illustrates a flow diagram depicting an embodiment of a workflow describing a user accessing one or more software products for a first time, and generating a glossary, in accordance with the present disclosure.

For example, FIG. 7A describes a workflow of the disambiguation module 203 providing disambiguation services to a user 701 accessing one or more software products, including application or services 703a, 703b being displayed by UI 219, as part of a single-interface experience. As shown in the embodiment 700 of FIG. 7A, a user 701 accesses content of one or more applications or services 703a, 703b for the first time. The user profile module 205 may record the first instance of the application or services 703a, 703b being accessed in the user's 701 profile. The content of applications or services 703a, 703b being accessed by the user, along with metadata and documentation associated with the applications or services 703a, 703b may be ingested by the NLP module 207. NLP module 207 may use the ingested data and metadata to generate network map 704a, 704b graphing the relationships and weights among the terms, words and multi-word expressions ingested and analyzed by the NLP module from the data and metadata. In some embodiments 700, the network map 704a may correspond to the content, data and metadata ingested by the NLP module 207 for application or service 703a, while network map 704b may represent the terms, words, and multi-word expressions corresponding to the content, data and metadata of application or service 703b.

As depicted in example of a network map 704a, 704b in FIG. 7A, each of the network maps 704a, 704b may include a plurality of terms or words as nodes connected together to form a graph by one or more edges connecting the nodes of terms together based upon closeness of the term's relationships as displayed by the UI 219. Terms that are closer in relationship may be directly connected together by an edge. In some instances, a node for a term may be connected to multiple terms within the graph of the network map 704a, 704b. For example, as shown in FIG. 7A, the node for term A in network map 704b may be directly linked by an edge to Term B, Term C and Term E as shown. Likewise, Term A in network map 704 A is shown only connected to Term X. Nodes of terms in the network map 704a, 704b directly connected to another term node by a shared edge may be considered to be $1^{st}$ degree neighbors. As shown in network map 704b, Term A's $1^{st}$ degree neighbors may be Term B, Term C and Term E. Likewise, in the network map 704a for application or service 703a, Term A's $1^{st}$ degree neighbor may be Term X which is directly connected along a shared edge with Term A.

In some embodiments of NLP module 207, a graphing ranking algorithm, such as a TextRank algorithm, may be applied to the data being graphed. The ranking algorithm may assign weights to each edge of the graph between the terms, words, groups of words and/or multi-word expressions of the graph; for example, based on a frequency of the relationships between the words or groups of words being represented by the graph. Vertices of the graph being generated by the NLP module 207 for each software product being accessed, may be ranked by score and sorted. In some embodiments, a selected number of vertices with the highest ranking score may be referred to as key terms or keywords. The key terms or keywords may be stored as part of a glossary database 215, as shown in FIG. 7a and may be accessed by the disambiguation module 203 during the performance of one or more comparisons and/or while cross referencing key terms and keywords between different software products that are accessed and/or displayed by the same UI 219. Moreover, in some embodiments, multi-word expressions can be identified from the graphs where the vertices of the graph comprise top ranked key terms or keywords are adjacent vertices.

Embodiments of the disambiguation module 203 may comprise a glossary module 209. The glossary module 209 may perform tasks, functions and/or processes of the disambiguation module 203, which may be associated with analyzing two or more glossaries of software products being accessed by a user, matching key terms or keywords of the selected glossaries being compared with one another and determining whether there are any overlapping key terms or keywords within the glossaries that are considered the same. Each time a software product is accessed by a user, embodiments of the glossary module 209 may perform a check to determine whether the software being accessed is a core product. As noted above, a core product may be identified within the user's profile in one of a plurality of ways. For example, labelling a software product as a core product may be based upon the amount of time a user has logged accessing the software product with the user's profile, the frequency of software product use, user-specific designation as a core product, or based upon a user's designated role or experience. If the software product being accessed by the user is identified as a core product, the glossary module 209 and/or the user profile module 205 may track or record the user's use of the core product to the user profile and/or update the glossary stored in the glossary database 215 for the specific software product being accessed. Conversely, where embodiments of the glossary module 209 identify a software product being accessed by the user is not considered a core product, the glossary module 209 may compare one or more glossaries of core products with the glossary of the software product being accessed, in order to identify one or more overlapping key terms or keywords with core products that may not have the same definition.

Embodiments of the glossary module 209 may perform tasks or functions comparing matching key terms or keywords for software being accessed with one or more core products. Such comparison functions or tasks can be performed by comparing a software product's glossary with a glossary of one or more designated core products. The comparison functions and the identification of overlapping key terms or keywords among software products with different definitions, may be performed using the graphs generated by the NLP module 207 which may be stored in glossary database 215. For example, a comparison algorithm may be executed by the glossary module 209, wherein the algorithm iteratively cycles through all the terms of the glossaries being compared. As the algorithm iteratively cycles through the terms, the glossary module 209 identifies the terms, terminology and/or multi-term expressions within the glossaries that are considered the same or similar (within a defined threshold limit of similarity). For each of the terms that are identified as being similar or the same, but present in different glossaries, the node of the graphs associated with the same or similar terms may be selected and one or more properties of the selected nodes may be extracted. For example, the glossary module 209 can extract the number of $1^{st}$ degree neighbors to the selected nodes and the names of the terms associated with the $1^{st}$ degree neighbors of the selected nodes. Moreover, in some embodiments, the glossary module 209 may extract the relative weights assigned to each of the edges of $1^{st}$ degree neighbors to the selected nodes; for example, the weight of the edge and the weight of all edges that are the $1^{st}$ degree from the selected node. While comparing the nodes of the graphs, some embodiments of the glossary module 209 may compare the values of the highest weighted $1^{st}$ degree neighbor for selected nodes being compared from the different graphs associated with the accessed software product and the core product. Embodiments of the glossary module 209 may conclude that the two terms associated with the nodes of the different graphs being compared are considered to be the same term if the value of the highest weighted $1^{st}$ degree neighbor to the node for each of the selected nodes being compared are the same value.

Although the glossary module 209 may indicate that the terms for the selected nodes may be considered to be the same term upon identifying that the value of the highest weighted $1^{st}$ degree neighbors for each of the terms being compared are the same, even if the values of the highest weighted $1^{st}$ degree neighbors to the selected nodes are not the same, the glossary module 209 may still identify the nodes as being the same through another method of comparison. For example, in some embodiments, the glossary module 209 may implement cosine similarity as a metric for measuring how similar the selected nodes of the different graphs are to one another. The glossary module 209 may normalize the weighted edge values of each graph; for example, normalizing the edge values to having a length of 1. The glossary module 209 may compute the cosine similarity of each selected node being compared by using the same selected degree of neighbors for each node during the calculation. Embodiments of the glossary module 209 may automatically select the number of degrees of neighbors to use for the calculation or the number of degrees of the neighbors in the graphs may be inputted by a user and/or stored in the user profile as part of the settings of the disambiguation module 203. Upon calculating the cosine similarity for each of the nodes of the graphs being compared, if the cosine similarity between the nodes is greater than a value V, which is a value between 0 and 1 that may be selected by the user and/or the disambiguation module 203, the terms of the nodes being compared are considered to be the same term. Otherwise, if the cosine similarity between the selected nodes being compared is not greater than the value V, the terms being compared are not considered the same by the glossary module 209.

Embodiments of the disambiguation module 203 may comprise a UI modification module 211. The UI modification module 211 may be responsible for performing tasks, functions and processes associated with altering or modifying the display of one or more software products via the UI 219, in response to the glossary module 209 identifying one or more key terms or keywords of the software product being accessed, that differ in definition from core products that might be more frequently accessed by the user or more commonly associated with the user's role. Overlapping terms of the software product's glossary and/or graph of the glossary, and the key terms or keywords within the glossary of the core products may be indicated on the UI 219 by the UI modification module 211. For example, in some embodiments, the UI modification module 211 may decorate the UI 219 to indicate the presence of an overlapping term that might not have the same meaning or definition as the similar or same term that may be part of a core product. The UI modification module's 211 decoration on the UI 219 may alert the user of the difference in order to prevent the user from assuming the terms have the same definition and/or meaning, in order to inform the user of the differing definitions between the terms or terminology that may appear the same on its face. For example, the term "policy" in a multi-cloud management software may be different from the term "policy" that might be displayed by edge computing tools. For example, in the multi-cloud management software, "policy" may refer to sets of standards, categories and controls that may be used to track compliance status of clusters within the cloud computing environment, whereas "policy" within the edge computing tools may relate to deployment patterns on the edge node of a network.

In some embodiments, the UI modification module 211 may insert alert messages, notifications, popup messages, highlight terms, or implement any other method for indicating the differences between the term being displayed by the UI 219 for the software product being accessed and the term associated with a core product. In some embodiments, a notification or other type of message prompt may appear on the UI 219. The notification or other type of message inserted by the UI modification module 211 may indicate the presence of the similar terms having different definitions, may describe the different definitions or meaning to the user and/or allow a user to adjudicate whether the interpretation of the definitions or the similarities in the terminology was accurately identified by the disambiguation module 203. The UI modification module 211 may include a user input within the notification that allows the user to accept or modify the determination made regarding the similarity between terms wherein the user may accept the notification message as correct, alert the disambiguation module 203 that the calculated similarity between the terms is incorrect, and/or correct the definition of one or more terms presented by the UI modification module 211.

Figure 6A:
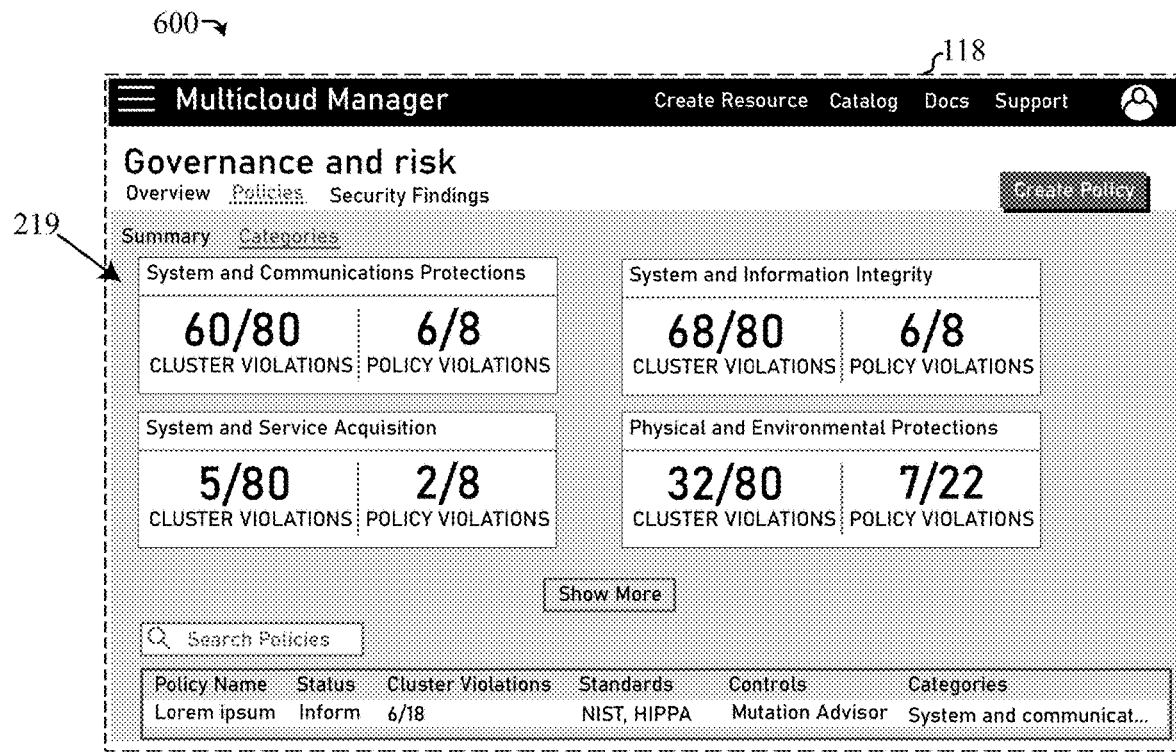
FIG. 6A depicts an embodiment of an unmodified user interface in accordance with the present disclosure.
Figure 6B:
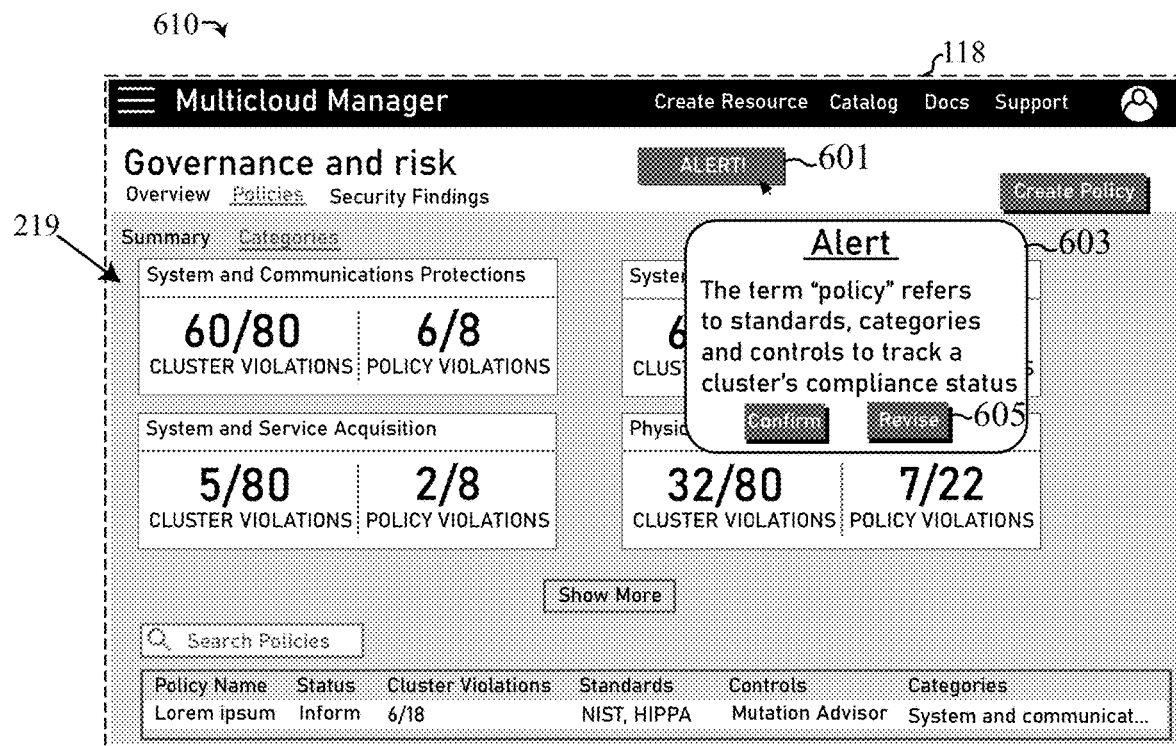
FIG. 6B depicts an embodiment of a modified user interface from the user interface of FIG. 6A, in accordance with the present disclosure.
Figure 6C:
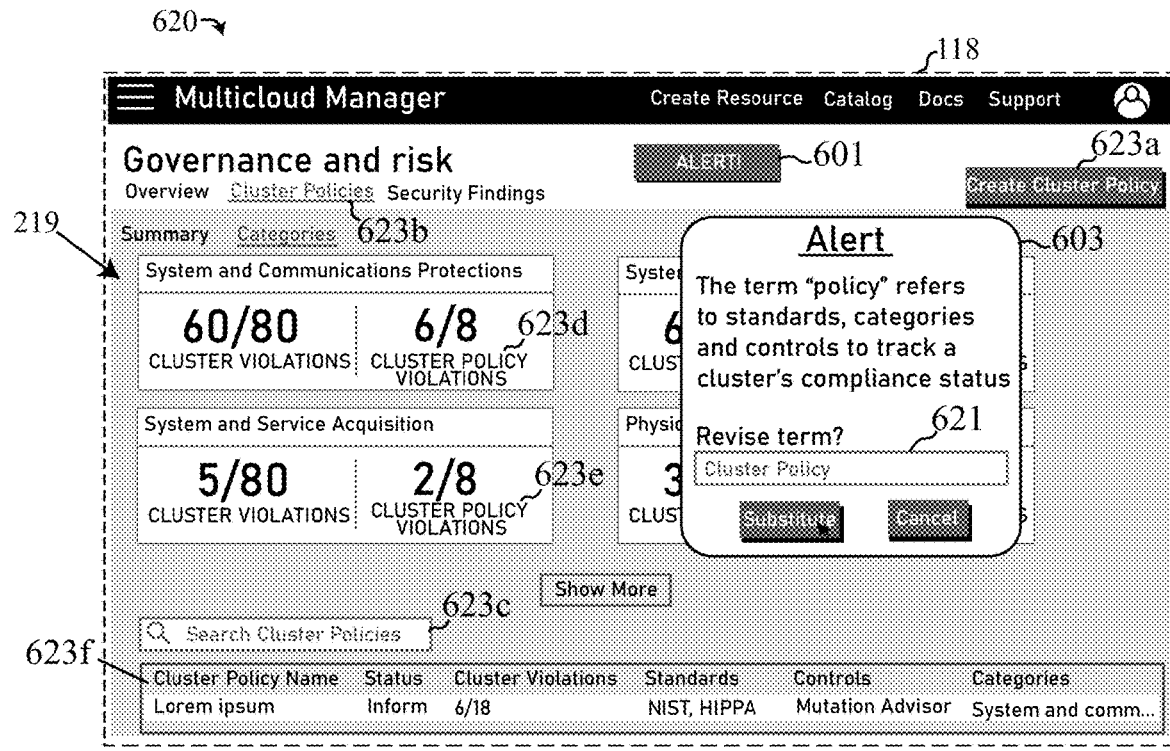
FIG. 6C depicts an alternative embodiment of a modified user interface from the user interface of FIG. 6A, in accordance with the present disclosure.

Referring to the drawings, FIG. 6A-6C demonstrate an example of the UI modification module 211 modifying a UI 219 displaying a software product being accessed by a user. As shown in FIG. 6A, embodiment 600 depicts the UI 219 in an unmodified state, displaying a multicloud manager software application. In one embodiment, as shown in FIG. 6B, embodiment 610 depicts one method the UI modification module 211 may modify the UI 219 in order to inform a user regarding one or more terms, text or visual elements being displayed by the multicloud manager are defined differently than other core products that a user may access via the UI 219. As shown in embodiment 610, the UI modification module 211 may generate an alert 601 and place the alert 601 onto the UI 219. As shown, when a user accesses the software product, the alert 601 may be interacted with, for example by clicking the alert on the UI 219, to display a notification message 603. In this example, the notification message 603 describes a definition of the term "policy", since the "policy" definition in the multicloud manager differs from one of the core products that a user may access more frequently and/or the user may have recorded a longer length of time accessing. As shown in FIG. 6B, a user receiving the alert 601 may review the definition of the term being presented in the notification message 603 and may confirm the definition and/or revise the definition; for example, by clicking the revise button 605 and inputting a new revised definition for the term "policy".

It should be noted that the terms, terminology and other vocabulary that may be modified by the UI modification module 211 may not simply be limited to computing terms such as "policy", "event", "error", "incident", "violation", "logs", etc., but may be used to modify the UI 219 for any type of specialized vocabulary that may differ from the vocabulary generally used or understood by a user. For example, other types of specialized vocabularies in a particular field, such as the legal profession or medical profession, may include less commonly understood definitions for commonly used words. For example, a user that may typically use a software product directed for use by medical professionals as a core product, wherein the UI 219 may regularly display a term such as "incident" to describe an acute medical condition or sudden medical event that affects a patient. However, if the medical professional accesses a non-core software product, for example software products for managing cloud-network computing resources that provide the services to a hospital, IT-related terms that describe "incidents" on the network may be confusing to a medical professional who may be more readily trained in understanding the medical definitions of "incident". Accordingly, embodiments of the disambiguation module 203, may be helpful for translating the definitions of terms or terminology that look the same or seem similar, across multiple professional disciplines, in addition to informing users across different roles or user experiences with different software products.

In some embodiments, the UI modification module 211 may modify the UI 219 to further include an input as part of the notification message 603 or prompt, that may allow a user to modify or change one or more terms in order to distinguish between the terms based on the inputted different names of the terms. The UI modification module 211 may update the UI 219 by propagating the user change throughout the UI 219, reflecting the modified term names that may now be distinguished from one another. The embodiment 620, depicted in FIG. 6C provides an example of such modifications being implemented to UI 219 by the UI modification module 211. As shown, upon opening alert 601, the notification message 603 displays the definition of the term and further asks the user whether or not to revise the term name. In such an embodiment, the notification message may include an input 621 that may allow the user to input the revised term name. As shown in the exemplary embodiment of FIG. 6C, a user has inputted "Cluster Policy" to replace "Policy" for the particular software product being displayed by the UI 219. Upon submitting the revision to the term name, the UI modification module 211 replaces one or more locations 623a-623f displaying the term "Policy" with the revised term "Cluster Policy" as inputted by the user, which now distinguishes the term "Policy" as defined by the core products used by the user, with "Cluster Policy" of the software product being accessed and displayed by UI 219 in the example of FIG. 6C.

In some embodiments, users may share their modified term names and/or definitions of terms with other users of a software's community. A user may accept or download the shared alterations or modifications to distinguish similar term names having different definitions, and upon selection of the shared term names or definitions, the UI modification module 211 may propagate the changes across the UI 219 for each software product previously accessed by the user. In some embodiments, the UI modification module 211 may automatically adopt definitions and/or modified term names and apply the modification to UI 219. The selection may be based on popularity or acceptance of the definitions for each of the software products amongst a community of users. The UI modification module 211 may alert the user of the applied change to the terms and/or definitions, wherein the user may accept the applied changes or revert the changes back to a previous definition or term name. In some instance, the UI modification module 211 may use machine learning to customize changes to the terms displayed by the UI 219, based on the specific patterns of the particular user's preferences to accept changes, apply modified terms or change definitions of terms to the UI 219.

Figure 6D:
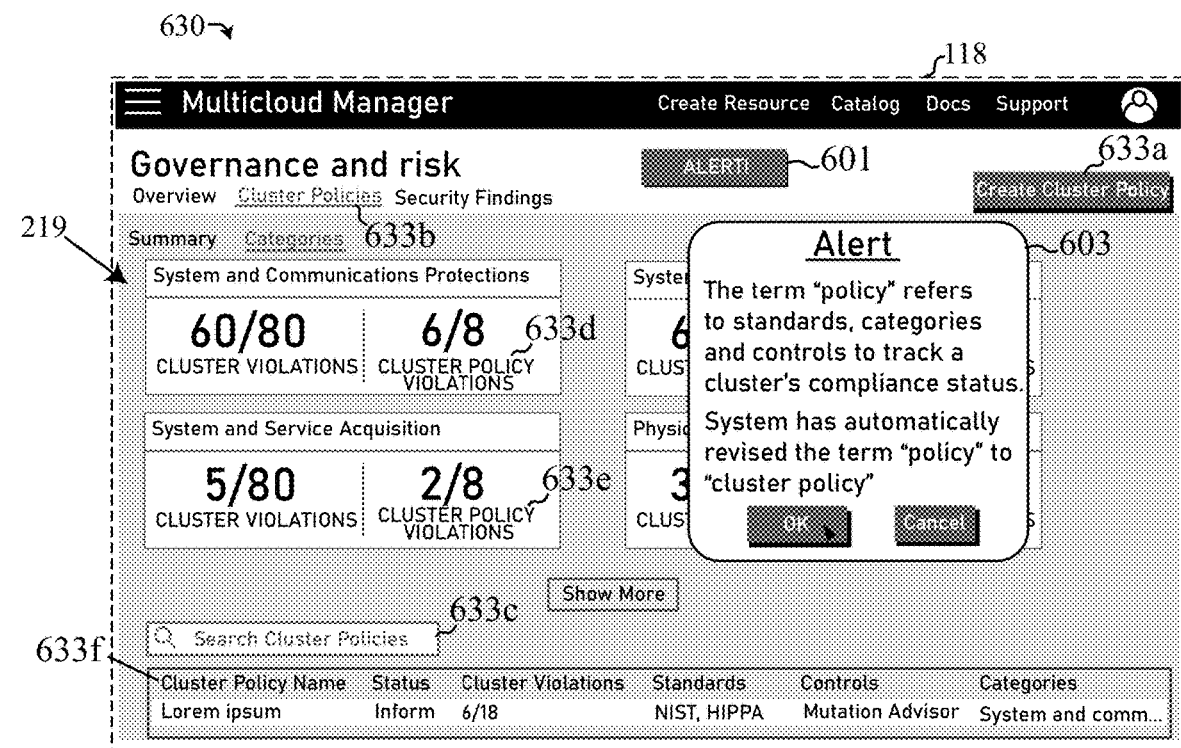
FIG. 6D depicts another alternative embodiment of a modified user interface from the user interface of FIG. 6A, in accordance with the present disclosure.

FIG. 6D, provides an example of alternative embodiment 630, wherein the UI modification module 211 automatically updates one or more terms of UI 219 at locations 633*a*-633*f*. As shown, an alert 601 is generated and added by the UI modification module 211 to UI 219. The generated alert 601 may contain a notification message 603 describing the definition of one or more terms and inform the user of the automatic revision of the term to a revised term name that has been propagated across UI 219 for the accessed software product. The user may indicate acceptance of the revised term name, keeping the modification to the UI 219 by the UI modification module 211 or cancel the automatic application of the revised term name, reverting the UI 219 back to the original UI 219 as shown in FIG. 6A. In this particular embodiment 630, the UI modification module 211 has identified the currently accessed software product containing the term "policy" to have a different definition of "policy" than a core product using the same or substantially similar term. The UI modification module 211 has automatically applied a modification to UI 219 changing "policy" to "cluster policy" and notifies the user via the notification message 603, providing a user the opportunity to accept the application of the changes to the UI 219 or remove the changes.

Figure 2B:
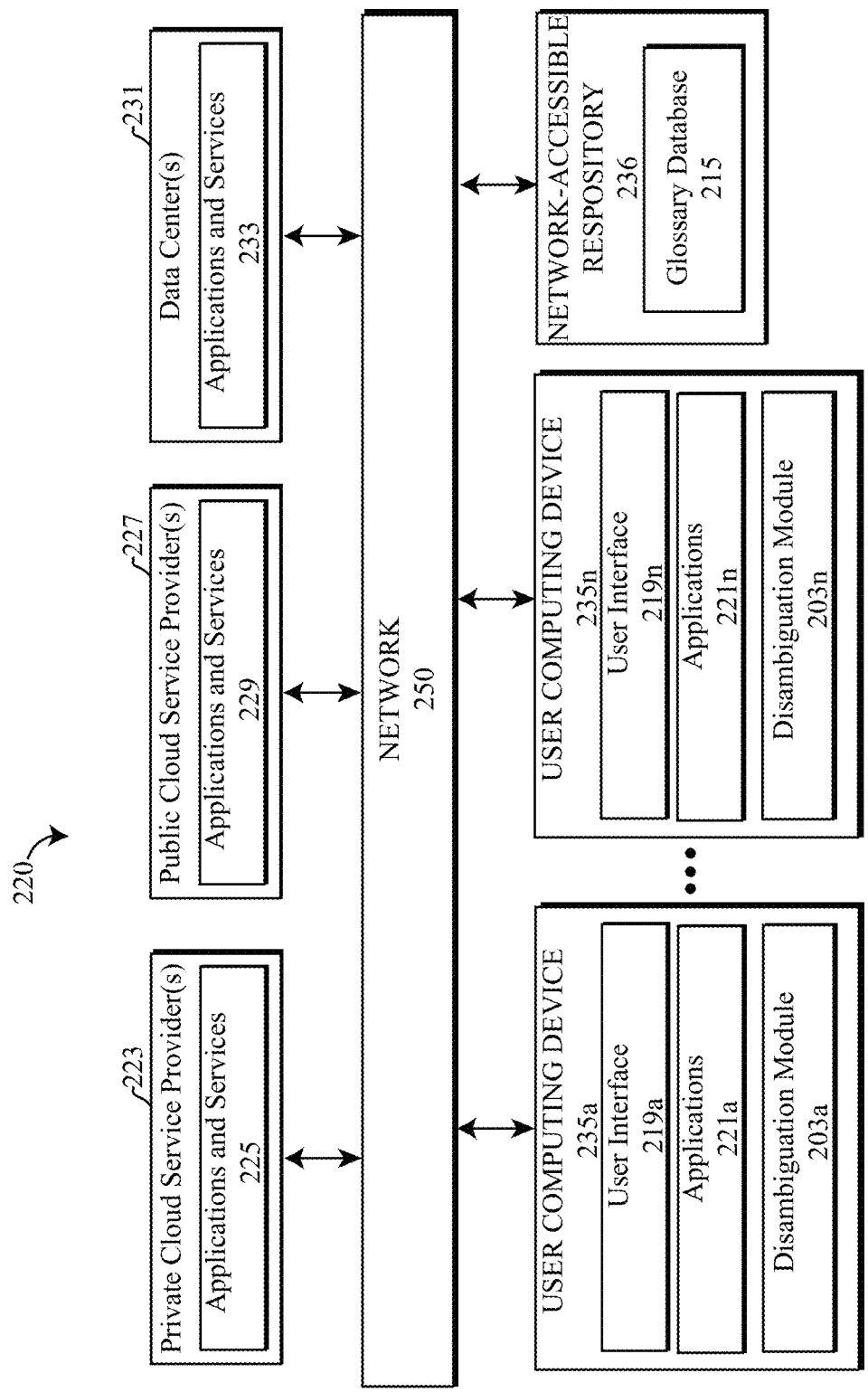
FIG. 2B depicts a functional block diagram describing an alternative embodiment of a computing environment in accordance with the present disclosure.

Referring to the drawings, FIG. 2B depicts an alternative embodiment to the computing environment 200 of FIG. 2A. As shown in FIG. 2B, the computing environment 220 differs from computing environment 200. Whereas in computing environment 200, the computing environment 200 depicts a host computing system 201 providing the program functions and tasks of the disambiguation module 203 hosted by the host computing system 201 to the client systems 217*a*-217*n*; in computing environment 220, the user computing devices 235*a*-235*n* may access and perform the functions or tasks of the disambiguation module 203*a*-203*n*. Moreover, in some embodiments of computing environment 220, one or more glossaries may be stored to persistent storage 106 of the user computing device 235 as a glossary database 215. In other instances, instead of the user computing device 235 storing the glossary database 215, a network-accessible repository 236 connected to network 250 may remotely store the glossary database 215. In some instance, the glossary database 215 may be shared amongst a plurality of user's accessing the network-accessible repository 236.

Figure 2C:
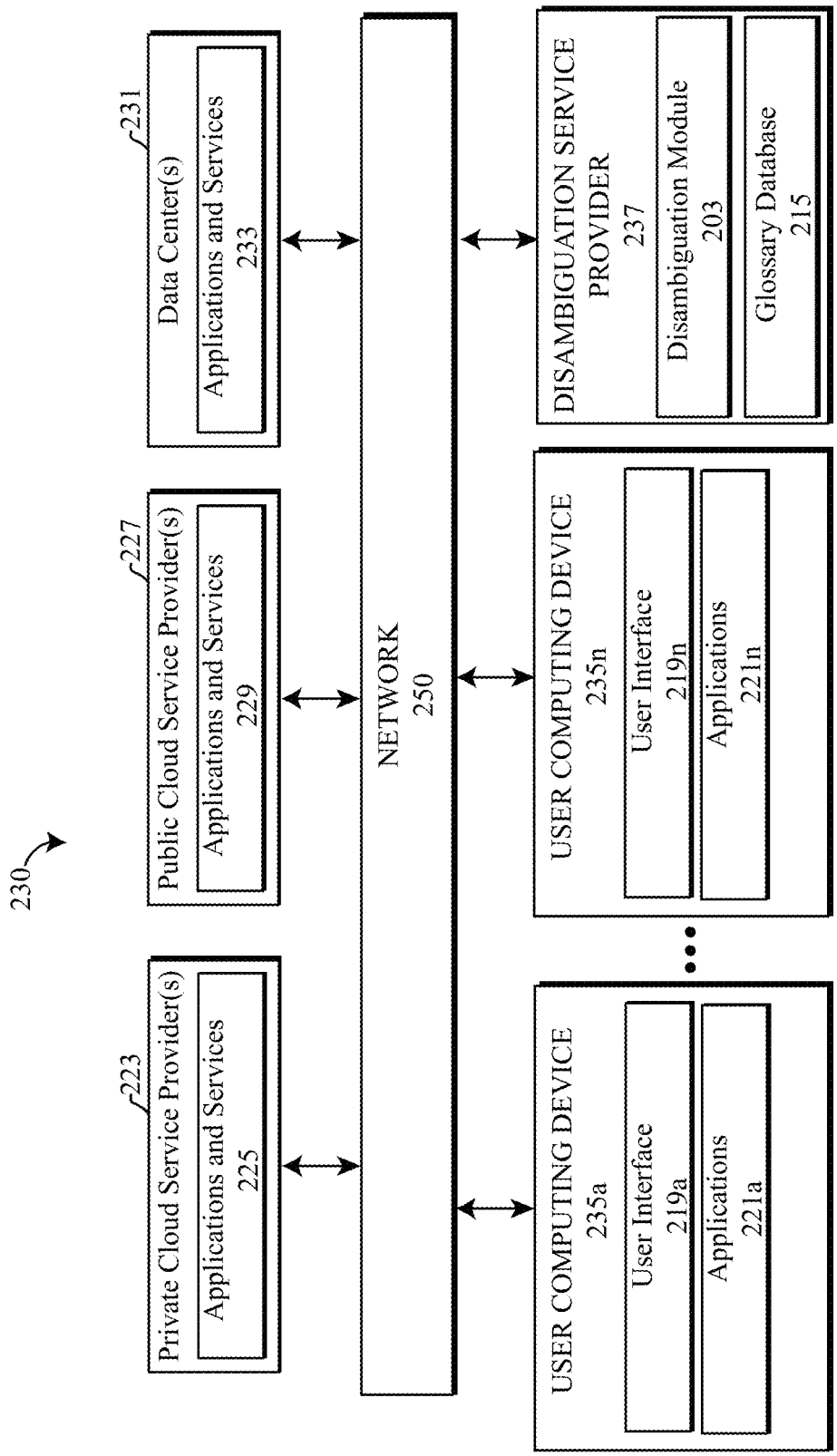
FIG. 2C depicts a functional block diagram describing another alternative embodiment of a computer environment, in accordance with the present disclosure.

Referring to FIG. 2C, another alternative embodiment of a computing environment 230 is shown. The computing environment 230 may differ from the computing environment 220, wherein instead of the user computing device 235*a*-235*n* directly performing the tasks or functions of the disambiguation module 203, a separate disambiguation service provider 237 may be providing disambiguation services and glossary databasing services to the user computing devices 235*a*-235*n* over network 250. For example, the disambiguation services of the disambiguation service provider 237 may be delivered as cloud native services to the users as part of a private cloud, public cloud or as part of a hybrid cloud service provider, integrating the private and public cloud software products being accessed from the private cloud service provider(s) 223 and/or public cloud service provider(s) 227.

Figure 7B:
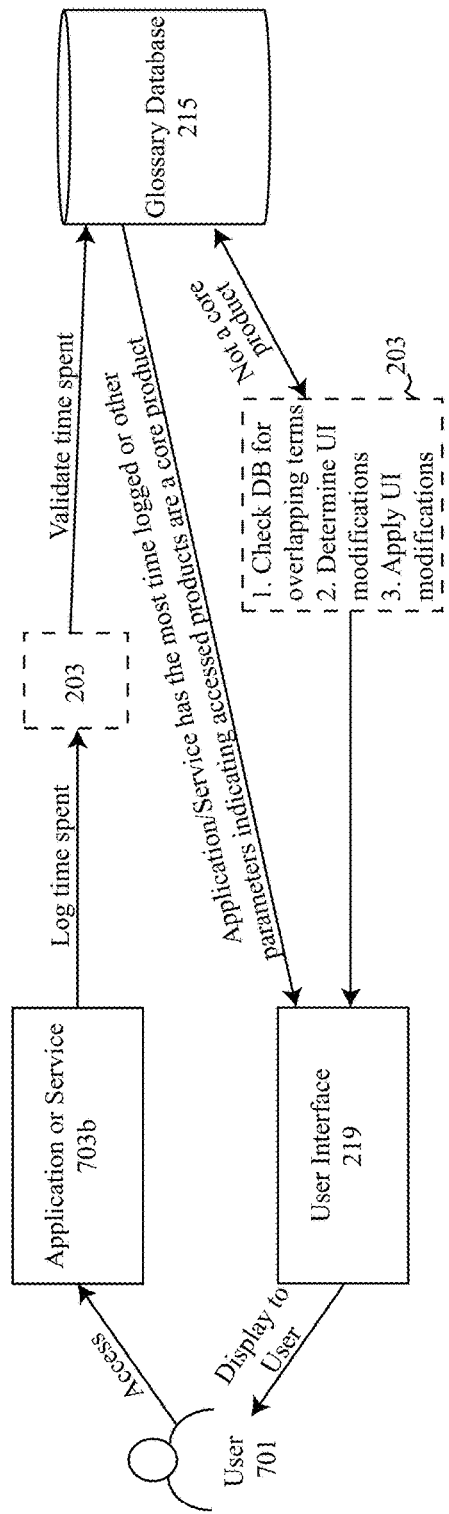
FIG. 7B illustrates a flow diagram depicting an embodiment of a workflow describing a user subsequently accessing one or more software products and disambiguating one or more key terms by applying one or more user interface modifications, in accordance with the present disclosure.

FIG. 7B depicts an example of an embodiment 720, describing a workflow that may occur as a user 701 subsequently accesses an application or service 703*b* (or any other type of software product) at a future point in time after previously accessing the application or service 703*b*; for example, as previously described above with regards to FIG. 7A. As shown by embodiment 720, user 701 accesses application or service 703*b*. Disambiguation module 203, or a sub-module thereof may record and log the amount of time spent accessing the application or service 703*b*, validate the amount of time spent, and retrieve glossary from the glossary database 215 for the application or service 703*b* being accessed by the user. The glossary module 209 may compare the amount of time logged by application or service 703*b* or any other available interactivity parameters that may be available as metrics for determining whether application or service 703*b* would be considered a core product, against each of the other software products previously accessed by the user 701. Examples of interactivity parameters may include the length of time accessing application or service 703*b*, frequency of access, default core products listed in the user profile or assigned based upon role, etc. In the example of FIG. 7B, length of time is used as the interactivity parameter for identifying a core product versus a non-core product, however, any of the parameters for identifying a core or non-core product may be used, including the amount of time a user has logged accessing the software product, the frequency of software product's use, user-specific designation of the software as a core product, and/or based upon a user's designated role or experience. Where application or service 703*b* is the software product having the most amount of time logged by user 701 (or other parameters that would indicate that the application or service 703*b* is a core product), the application or service 703*b* is displayed to the user 701 as part of the UI 219, unmodified.

As shown in embodiment 720, where application or service 703*b* does not have the most time logged by the user profile (or another parameter as described above that would indicate the application or service 703*b* being accessed by the user is designated as a core product), the glossary database 215 is searched for a glossary of the software product having the most time logged by the user (in this particular example depicted in FIG. 7B). In other embodiments, where one or more of the other parameters are used to determine whether the application or service 703*b* being accessed is a core product, the glossary database 215 can be searched for a software product(s) that meet the selected parameter(s) for being designated as a core product; for example, a software product used more frequently, user-designation(s) as a core product and or designations as a core product based on a user's role or experience. Upon identification of the software product with the most time logged (or other corresponding parameter that would indicate a core product in the glossary database 215), the glossary module 209 may compare the glossary of the core product with the glossary of application or service 703*b*, as described about the glossary module 209, in detail above. Where the glossary module 209 identifies one or more terms that overlap or differ in application or service 703*b* from the core product, the glossary module 209 may indicate such differences in definitions between similar terms to the UI modification module 211, which may determine one or more modifications, alerts or notifications to present to the user 701 and/or apply to the UI 219 wherein said modifications, alerts, notifications, etc. are presented to the user to view, accept, deny and/or further modify.

Method for Alleviating User Interface Ambiguity Between Software

Figure 8A:
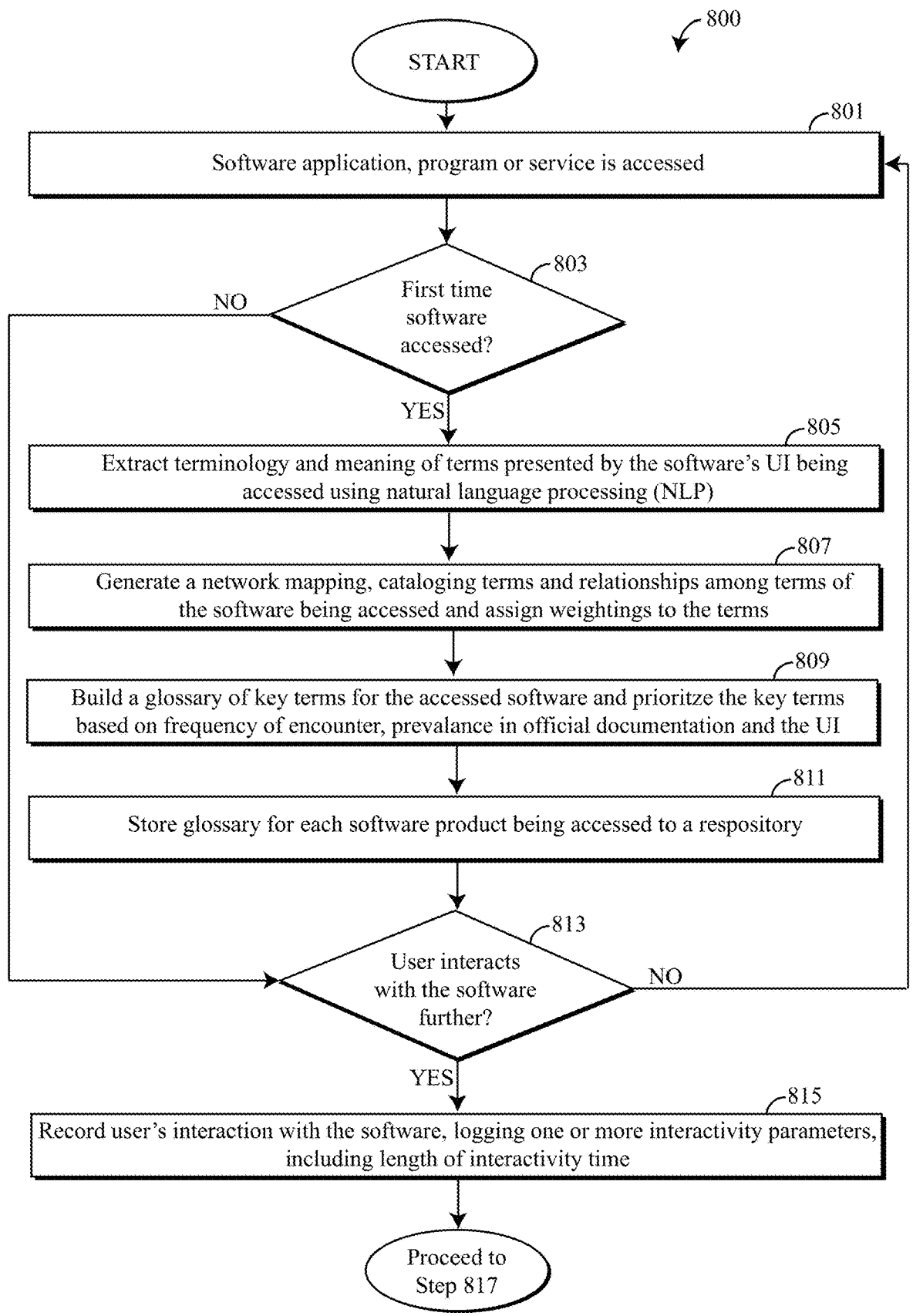
FIG. 8A depicts a flow diagram describing an embodiment of a method for disambiguating a user interface.
Figure 8B:
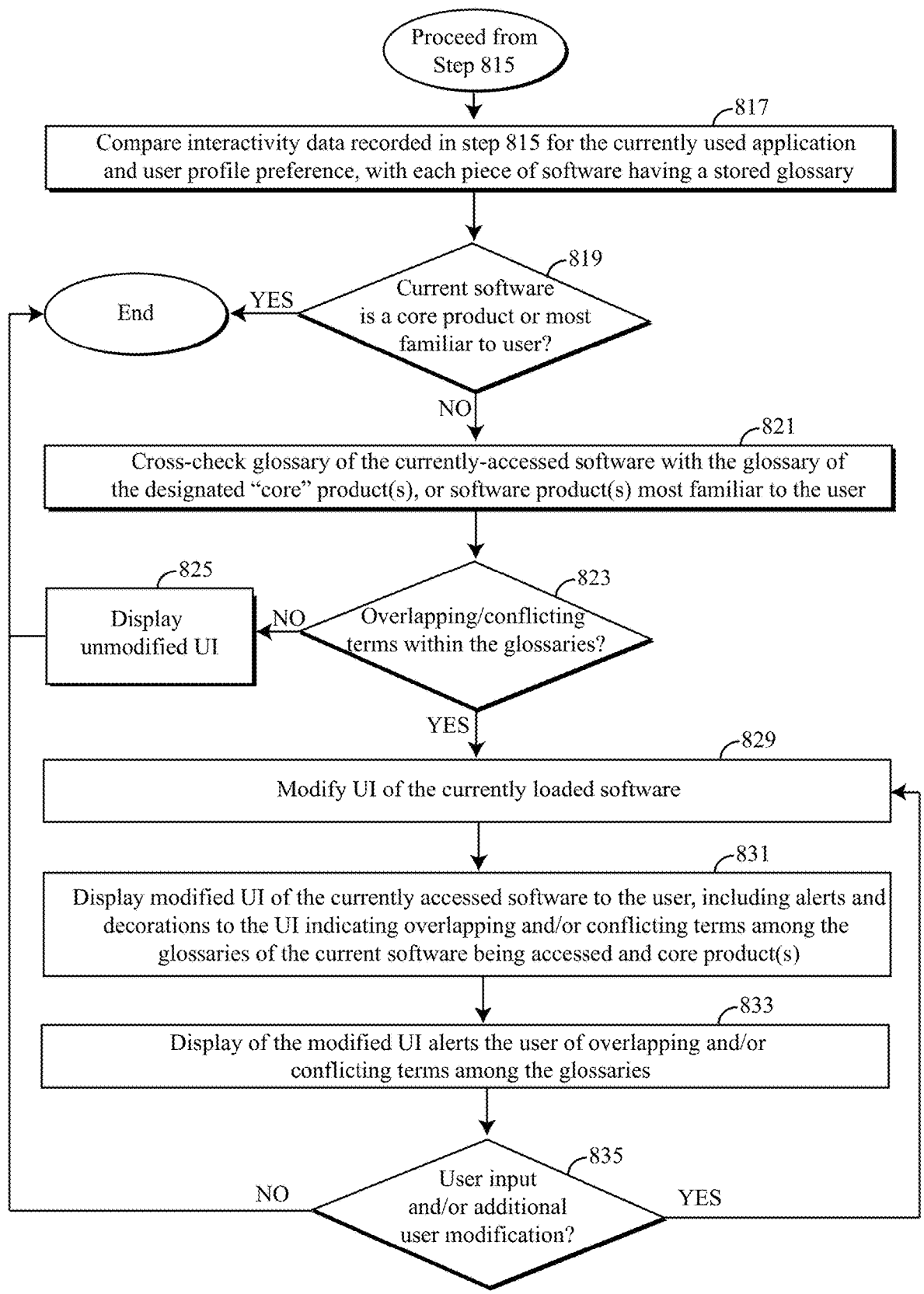
FIG. 8B is a continuation of the flow diagram of FIG. 8A, describing the embodiment for disambiguating the user interface.

The drawings of FIG. 8A-8B represent embodiments of algorithms for implementing computerized methods for alleviating ambiguity between terms and terminology used by a plurality of software products that may be displayed using a single UI 219 experience in a computing environment as described in accordance with FIGS. 2a-7b above, using one or more computing systems defined generically by computing system 100 of FIG. 1, and more specifically by the embodiments of specialized computer systems depicted in FIGS. 2a-7b and as described herein. A person skilled in the art should recognize that the steps of the method described in FIG. 8A-8B, along with the methods of FIG. 9 and FIG. 10, may be performed in a different order than presented and may not require all the steps described herein to be performed. Rather, some embodiments may alter the methods by using one or more of the steps discussed below.

FIG. 8A presents a flowchart illustrating an algorithm 800 for alleviating ambiguity between the similar terms and terminology presented by one or more software products displayed by a UI 219 and modifying the UI 219, in accordance with the embodiments of the present disclosure. The embodiment of the algorithm 800 may begin at step 801. In step 801, A software application, program, service, workload or any other type of software product may be accessed by a user. For example, a user may access the software product using a client system 217 (physical or virtual) being hosted by a host computer system 201, and/or a user computer device 235 connected to network 250. The software products being accessed by the user may be locally stored by the user computer device 235 or client system 217, made accessible to the client system 217 by a host computer system 201, hosted by data center(s) 231 connected to network 250, hosted by private cloud service provider(s) 223 and/or hosted by public cloud service provider(s) 227, or any other type of software provider, locally stored or made accessible remotely over a computer network, including the Internet.

In step 803 of algorithm 800, a determination may be made whether the software being accessed in step 801 is being accessed for the first time. If the software product being accessed in step 801 is not being accessed for the first time, the algorithm may proceed to step 813, otherwise, if the software product is being accessed for the first time, the algorithm may proceed to step 805. In step 805, the natural language processing is used to extract terms and terminology of the software product being presented by the UI 219, including the terms or terminology of the software's content, data, metadata and/or associated documentation, such as official software operation manuals. In the exemplary embodiment, extraction of the data, metadata, documentation and content visually displayed by the UI 219 may be ingested by NLP module 207 and processed in accordance with the details described above.

In step 807, a network mapping of the accessed software product may be graphically generated. The graph of the network map may catalog the terms and terminology of the software product, the words displayed by the UI 219 and/or multi-word expressions displayed by the software product via the UI 219. Moreover, the graph of the network map cataloging the terms and terminology of the software product being accessed, may further map one or more relationships between terms and terminology of the software product and assign weightings to each of the terms in the graph of the network map. In step 809, a glossary of key terms for the software product being accessed may be generated. The key terms of the generated glossary may be assigned and prioritized based on frequency of a term or terminology within the software product occurring, prevalence of the term or terminology in official documentation of the software product and/or the number of times the terms and terminology are displayed by the UI 219. In step 811, the glossary of key terms and terminology that is associated with the software product may be stored as port of a repository, such as the glossary database 215 or network-accessible repository 236.

Figure 9:
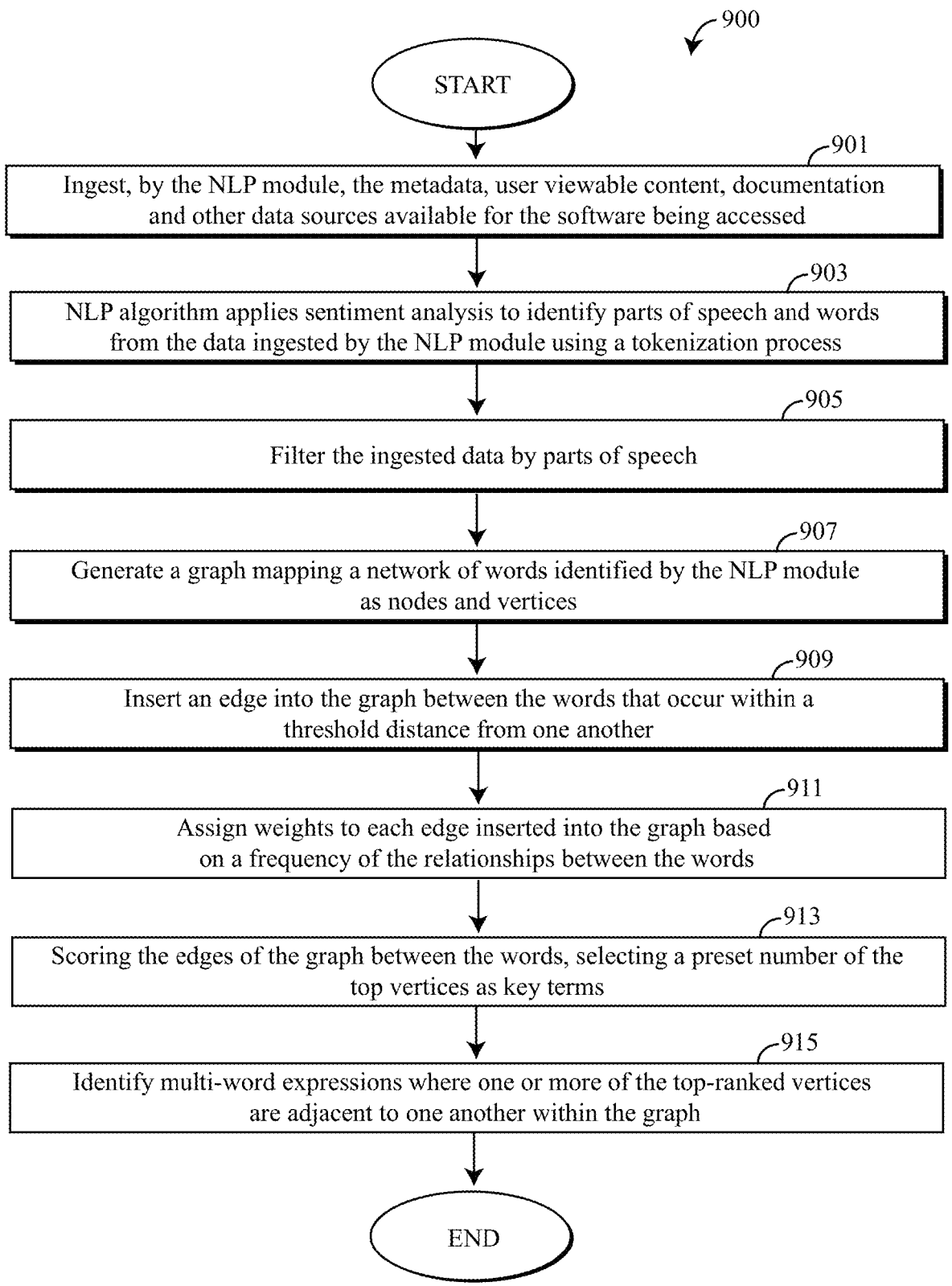
FIG. 9 depicts a flow diagram describing an embodiment of a method for generating glossaries for key terms of software, in accordance with the present disclosure.
Figure 10:
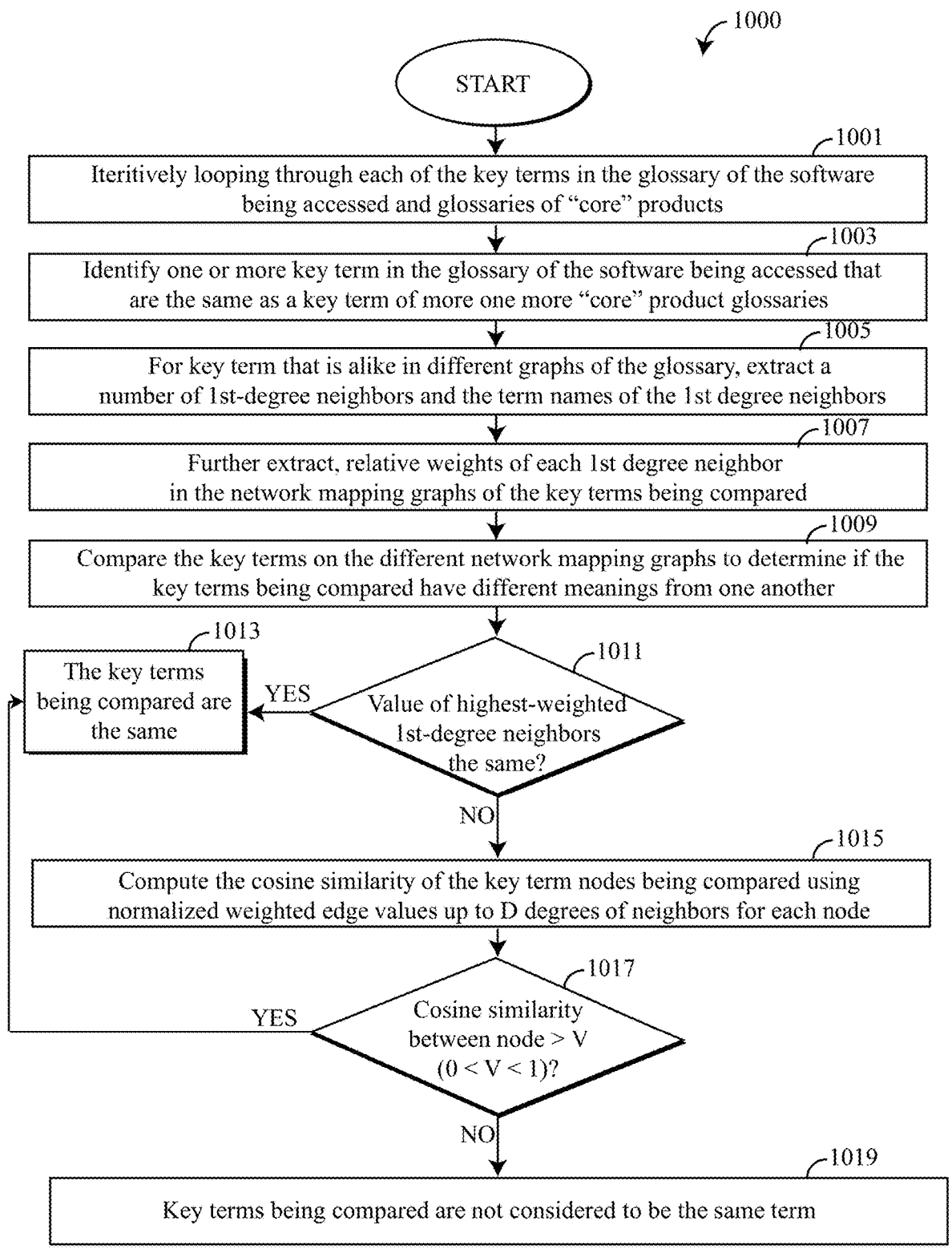
FIG. 10 depicts a flow diagram describing an embodiment of a method for matching key terms displayed by software on a user interface, with different definitions, in accordance with the present disclosure.

Referring to the drawings, FIG. 9 describes one or more intermediate steps of steps 805, 807, 809 and 811 of algorithm 800 in more detail. Beginning with the extraction step 805, step 901 of algorithm 900 provides an embodiment wherein the NLP module 207 ingests the metadata, user-viewable content displayed by the UI, official documentation and/or other data sources that may be available for the software product being accessed by the user. In step 903, the NLP module 207 may apply an NLP algorithm that implements sentiment analysis to the ingested data and metadata of step 901. The sentiment analysis applied by the NLP algorithm may identify parts of speech from the ingested data and metadata of step 901. In the exemplary embodiment, parts of speech may be identified using a tokenization process.

In step 905, the NLP module 207 may filter the data and metadata ingested by the NLP module by part of speech and in step 907 generate the graph of the network mapping of the terms and words identified by the NLP module in step 903. The NLP module 207 may generate the graph to include nodes and vertices, wherein one or more terms or words may comprise a node of the graph being generated. In step 909, the NLP module 207 may insert one or more edges into the graph between terms and words that have been identified as being within a threshold distance of one another in the data or metadata ingested by the NLP module 207 in step 901. The threshold distance may be set by the NLP module 207, the user, an administrator of the disambiguation module 203, a service provider thereof, etc.

In step 911, the NLP module 207 may assign weights to each edge of the graph being generated as part of the network mapping for the terms and words processed by the NLP module 207. Embodiments of the NLP module may assign the weights to each edge inserted into the graphs based on the frequency of the relationships between the words and terms. For example, where a relationship between two or more words occurs more frequently as part of the ingested data or metadata, an increased weight may be assigned to the edge between the two or more words in the generated graph. In step 913, the edges of the graph between the two or more words in the network map are scored and a preset number of the highest-ranking scores assigned to the vertices within the graph are identified as key terms. In step 915, multi-word expressions within the graph may be identified by the NLP module 207 wherein one or more of the top ranked vertices in step 913 are adjacent to one another within the graph.

Referring to FIG. 8A, upon storage of the glossary comprising the graph of the networking map for each of the terms and terminology of the software product being accessed in step 811, the algorithm 800 may proceed to step 813. During step 813, a determination is made whether a user accessing the software product interacts any further with the software. If the user does not interact with the software product any further, the algorithm 800 returns to step 801 and may proceed again upon a user accessing one or more software products. Conversely, where the user continues to interact with the software product being accessed further, the algorithm 800 may proceed to step 815. During step 815, the user's interactions with the software product may be recorded and logged. For example, to the user's profile. The user's activity, including one or more interactivity parameters may be recorded, including but not limited to the length of time a user interacts with the software product, and frequency of the software product's use.

In step 817 of algorithm 800, the glossary module 209 may compare the data describing one or more interactivity parameter collected during step 815 for the software product currently being accessed with the data collected for each software application of the glossary database 215 that has interactivity parameters collected. The comparison between the interactivity parameters of the currently accessed software product and previously accessed software products may help determine whether the software currently being accessed is a core product that is most familiar to the user or not. In step 819, a determination is made whether the current software product being accessed is a core product and/or most familiar to the user. If the determination is made that the software product being accessed is a core product and/or software most familiar to the user, the algorithm 800 may end and display the software product being accessed to the UI 219 in an unmodified state. Conversely, where the algorithm 800 determines in step 819 that the software being accessed by the user is not a core product and/or software that is most familiar to the user, the algorithm 800 may proceed to step 821.

During step 821, the glossary module 209 may cross check the key terms within the glossary of the software product currently being accessed with the glossaries of previously accessed software products designated as core products and/or software products considered to be most familiar to the user, to determine whether there are overlapping terms between the software product being accessed and the core software product glossaries, comprising conflicting definitions. The algorithm 1000 of FIG. 10 further elaborates and details methods for cross checking the glossaries in accordance with step 821.

During the cross-checking of the glossaries in step 821, for overlapping and conflicting terms, algorithm 1000 may begin at step 1001, wherein the glossary module 209 may iteratively loop through the glossary of the software product being accessed and each of the core product glossaries stored by glossary database 215. In step 1003, the glossary module identifies one or more key terms within the glossary of the software being accessed that is the same or substantially similar to the key terms in one or more core product glossaries. In step 1005, for each key term that is considered the same or similar but in different graphs of the separate glossaries, the glossary module 209 may extract a number of $1^{st}$ degree neighboring nodes and the term names for each neighboring node in the graph, for the terms identified as being the same or similar in step 1003. In step 1007, the glossary module may further extract relative weights for each $1^{st}$ degree neighbor within the graph for the key terms being compared.

In step 1009 of algorithm 1000, the key terms of the separate glossaries are compared to determine whether or not the key terms have different meanings. This comparison may be performed by comparing the highest-weighted $1^{st}$ degree neighbor in the graphs for each of the terms being compared. In step 1011, a determination is made whether the value of the highest-weighted $1^{st}$ degree neighbor of the nodes for the terms being compared is the same. If the nodes for the $1^{st}$ degree neighbors with the highest value for each term are the same, then the algorithm may proceed to step 1013, wherein the key terms being compared are considered the same. otherwise, if in step 1011 the highest-weighted $1^{st}$ degree neighbor for each key term is not the same for both terms being compared, then the algorithm may proceed to step 1015.

In step 1015 of algorithm 1000, the glossary module 209 may normalize the weighted edge values of the terms of each graph being compared and compute the cosine similarity for each of the key term nodes of the graphs up to a selected number of degrees (D) of neighbors for each key term node. In step 1017, a determination is made whether for the key term nodes being compared, the cosine similarity between the nodes is greater than a value V, wherein V is greater than 0 but less than 1. If the cosine similarity for the key term nodes being compared is greater than the value for V, the algorithm proceeds to step 1013 and the key terms being compared are considered to be the same. Conversely, where the cosine similarity for the key term nodes being compared is less than the value V, the algorithm proceeds to step 1019, wherein the key terms being compared are not considered to be the same term, and thus the terms may overlap in appearance but conflict in definition.

Returning back to algorithm 800, upon cross-checking the glossaries for the key terms being compared, in step 823 a determination is made whether the key terms that are compared between the graph of the software product being accessed and the graph of the core product include overlapping nodes for terms that appear the same but comprise conflicting definitions. If as a result of running algorithm 1000 as part of step 821 determines that the key terms being compared are the same, the algorithm 800 may proceed from step 823 to step 825 and display the UI 219 in an unmodified state. Conversely, where during step 821, the cross-checking of the glossaries per algorithm 1000 reveals that the key terms being compared are overlapping and/or conflicting in definition, the algorithm 800 may proceed to step 829.

In step 829, the UI modification module 211 may modify the UI 219 of the software product being accessed. The modifications to the UI 219 may include the insertion of one or more alerts and/or decoration of the UI 219 to indicate the presence of the overlapping and/or conflicting key terms. In step 831 the UI 219 displays the modified UI of the currently accessed software to the user. The modified UI being displayed can include the alerts and/or decoration that alter the UI 219, providing an indication and/or explanation of the overlapping or conflicting terms or terminology among the glossaries of the current software being accessed and the one or more core products having the same or substantially similar terms with different definitions or meanings.

In step 833, the display of the modified UI may alert and draw the user's attention to the overlapping and/or conflicting terms. In some embodiments the user may provide additional feedback and/or further modify the UI 219. For example, adjudicating or accepting definitions of terms, revising term names and/or accepting or declining automated terms name revisions presented by the UI modification module 211. In step 835, a determination may be made whether or not the alerts and/or modifications of the UI 219 by the user in step 833 results in user input or additional modifications to the UI 219 requested by the user. If in step 835, the user has submitted user input or additional modifications to the modified UI 219, the algorithm 800 may return to step 829, wherein the UI modification module 211 may further modify the UI 219 based on the feedback and input from the user. If, on the other hand, in step 835, the user does not provide additional feedback such as user input or additional modifications that would further modify the UI 219, the algorithm may end.

What is claimed is:

1. A computer-implemented method comprising the steps of:
   accessing, by a processor, software;
   extracting, by the processor, one or more terms displayed as part of a user interface (UI) of the software, using natural language processing (NLP);
   generating, by the processor, a network map cataloging the one or more terms and relationships among the one or more terms;
   building, by the processor, a glossary of the one or more terms from the network map;
   cross-checking, by the processor, a glossary of previously accessed software with the glossary of the one or more terms to identify one or more overlapping terms, wherein the one or more overlapping terms have different meanings;
   iteratively looping through the glossary of the previously accessed software, searching for matching terms in different network maps;
   identifying a node for the matching terms in each network map;
   extracting from the node for each of the matching terms a number of $1^{st}$ degree neighbors in the network map, term names of the $1^{st}$ degree neighbors and relative weight of each edge of the $1^{st}$ degree neighbors;
   comparing highest weighted $1^{st}$ degree neighbors of the matching terms, wherein, where values of the highest weighted $1^{st}$ degree neighbors from different network maps are equal, the matching terms are the same; and
   modifying, by the processor, the UI to indicate a presence of the one or more overlapping terms being displayed by the UI and alerting a user of the different meanings among the overlapping terms.

2. The computer-implemented method of claim 1, further comprising:
   recording, by the processor, interactivity data comprising one or more interactivity parameters;
   comparing, by the processor, the interactivity data for the software with interactivity data of the previously accessed software; and
   in response to comparing the interactivity data, determining, by the processor, that an interactivity level of one or more of the previously accessed software is greater than an interactivity level of the software being accessed.

3. The computer-implemented method of claim 1, wherein building the glossary further comprises:
   generating, by the processor, a graph mapping the one or more terms as nodes and vertices of the graph;
   inserting, by the processor, an edge into the graph between the one or more terms that occur within a threshold distance between one another;
   assigning, by the processor, weights to each edge inserted into the graph based on a frequency of relationships among the one or more terms;
   scoring, by the processor, each edge between the one or more terms; and selecting, by the processor, a preset number of vertices connected to edges having a highest score within the graph as key terms of the glossary.

4. The computer-implemented method of claim 1, wherein the extracting of the one or more terms comprises:
   ingesting, by the processor, one or more of metadata, user-viewable content and documentation associated with the software being accessed by an NLP processor; and
   applying, by the processor, sentiment analysis by an NLP algorithm, said sentiment analysis configured to identify parts of speech and the one or more terms from the metadata, the user-viewable content and the documentation ingested by the NLP processor, using tokenization.

5. The computer-implemented method of claim 1, further comprising:
   wherein the highest weighted $1^{st}$ degree neighbors from the different network maps are not equal, normalizing the relative weight of each edge of the $1^{st}$ degree neighbors; and
   calculating cosine similarity of nodes for each of the matching terms, wherein where the cosine similarity of the nodes for the matching terms are a value between 0 and 1, the matching terms are considered the same, otherwise the matching terms are not the same.

6. The computer-implemented method of claim 1, wherein modifying, by the processor, UI further comprises:
   automatically renaming or re-defining the overlapping terms displayed by the UI; or
   inputting, into an input element re-named or re-defined overlapping terms and substituting one or more of the overlapping terms on the UI with the re-named or re-defined overlapping terms inputted into the input element.

7. A computer system comprising:
   a processor; and
   a computer-readable storage media coupled to the processor, wherein the computer-readable storage media contains program instructions executing a computer-implemented method comprising the steps of:
   accessing, by the processor, software;
   extracting, by the processor, one or more terms displayed as part of a user interface (UI) of the software, using natural language processing (NLP);
   generating, by the processor, a network map cataloging the one or more terms and relationships among the one or more terms;
   building, by the processor, a glossary of the one or more terms from the network map;
   cross-checking, by the processor, a glossary of previously accessed software with the glossary of the one or more terms to identify one or more overlapping terms, wherein the one or more overlapping terms have different meanings;
   iteratively looping through the glossary of the previously accessed software, searching for matching terms in different network maps;
   identifying a node for the matching terms in each network map;
   extracting from the node for each of the matching terms a number of $1^{st}$ degree neighbors in the network map, term names of the $1^{st}$ degree neighbors and relative weight of each edge of the $1^{st}$ degree neighbors;
   comparing highest weighted $1^{st}$ degree neighbors of the matching terms, wherein, where values of the highest weighted $1^{st}$ degree neighbors from different network maps are equal, the matching terms are the same; and modifying, by the processor, UI to indicate a presence of the one or more overlapping terms being displayed by the UI and alerting a user of the different meanings among the overlapping terms.

8. The computer system of claim 7, wherein modifying, by the processor, the UI further comprises:
automatically renaming or re-defining the overlapping terms displayed by the UI; or
inputting, into an input element, re-named or re-defined overlapping terms and substituting one or more of the overlapping terms on the UI with the re-named or re-defined overlapping terms inputted into the input element.

9. The computer system of claim 7, wherein building the glossary further comprises:
generating, by the processor, a graph mapping the one or more terms as nodes and vertices of the graph;
inserting, by the processor, an edge into the graph between the one or more terms that occur within a threshold distance between one another;
assigning, by the processor, weights to each edge inserted into the graph based on a frequency of relationships among the one or more terms;
scoring, by the processor, each edge between the one or more terms; and
selecting, by the processor, a preset number of vertices connected to edges having a highest score within the graph as key terms of the glossary.

10. The computer system of claim 7, wherein the extracting of the one or more terms comprises:
ingesting, by the processor, one or more of metadata, user-viewable content and documentation associated with the software being accessed by an NLP processor; and
applying, by the processor, sentiment analysis by an NLP algorithm, said sentiment analysis configured to identify parts of speech and the one or more terms from the metadata, the user-viewable content and the documentation ingested by the NLP processor, using tokenization.

11. The computer system of claim 7, further comprising:
wherein the highest weighted $1^{st}$ degree neighbors from the different network maps are not equal, normalizing the relative weight of each edge of the $1^{st}$ degree neighbors; and
calculating cosine similarity of nodes for each of the matching terms, wherein where the cosine similarity of the nodes for the matching terms are a value between 0 and 1, the matching terms are considered the same, otherwise the matching terms are not the same.

12. A computer program product comprising:
one or more computer readable storage media having computer-readable program instructions stored on the one or more computer readable storage media, said program instructions executes a computer-implemented method comprising the steps of:
accessing, by a processor, software;
extracting, by the processor, one or more terms displayed as part of a user interface (UI) of the software, using natural language processing (NLP);
generating, by the processor, a network map cataloging the one or more terms and relationships among the one or more terms;
building, by the processor, a glossary of the one or more terms from the network map;
cross-checking, by the processor, a glossary of the previously accessed software with the glossary of the one or more terms to identify one or more overlapping terms, wherein the one or more overlapping terms have different meanings;
iteratively looping through the glossary of the previously accessed software, searching for matching terms in different network maps;
identifying a node for the matching terms in each network map;
extracting from the node for each of the matching terms a number of $1^{st}$ degree neighbors in the network map, term names of the $1^{st}$ degree neighbors and relative weight of each edge of the $1^{st}$ degree neighbors;
comparing highest weighted $1^{st}$ degree neighbors of the matching terms, wherein, where values of the highest weighted $1^{st}$ degree neighbors from different network maps are equal, the matching terms are the same; and
modifying, by the processor, the UI to indicate a presence of the one or more overlapping terms being displayed by the UI and alerting a user of the different meanings among the overlapping terms.

13. The computer program product of claim 12 further comprising:
recording, by the processor, interactivity data comprising one or more interactivity parameters;
comparing, by the processor, the interactivity data for the software with interactivity data of the previously accessed software; and
in response to comparing the interactivity data, determining, by the processor, that an interactivity level of one or more of the previously accessed software is greater than an interactivity level of the software being accessed.

14. The computer program product of claim 12, wherein building the glossary further comprises:
generating, by the processor, a graph mapping the one or more terms as nodes and vertices of the graph;
inserting, by the processor, an edge into the graph between the one or more terms that occur within a threshold distance between one another;
assigning, by the processor, weights to each edge inserted into the graph based on a frequency of relationships among the one or more terms;
scoring, by the processor, each edge between the one or more terms; and
selecting, by the processor, a preset number of vertices connected to edges having a highest score within the graph as key terms of the glossary.

15. The computer program product of claim 12, wherein the extracting of the one or more terms comprises:
ingesting, by the processor, one or more of metadata, user-viewable content and documentation associated with the software being accessed by an NLP processor; and
applying, by the processor, sentiment analysis by an NLP algorithm, said sentiment analysis configured to identify parts of speech and the one or more terms from the metadata, the user-viewable content and the documentation ingested by the NLP processor, using tokenization.

16. The computer program product of claim 12, further comprising:
wherein the highest weighted $1^{st}$ degree neighbors from the different network maps are not equal, normalizing the relative weight of each edge of the $1^{st}$ degree neighbors; and calculating cosine similarity of nodes for each of the matching terms, wherein where the cosine similarity of the nodes for the matching terms are a value between 0 and 1, the matching terms are considered the same, otherwise the matching terms are not the same.

17. The computer program product of claim 12, wherein modifying, by the processor, the UI further comprises:
  automatically renaming or re-defining the overlapping terms displayed by the UI; or
  inputting, into an input element, re-named or re-defined overlapping terms, and substituting one or more of the overlapping terms on the UI with the re-named or re-defined overlapping terms inputted into the input element.

* * * * *